(12) United States Patent
Muthler et al.

(10) Patent No.: US 11,816,783 B2
(45) Date of Patent: *Nov. 14, 2023

(54) ENHANCED TECHNIQUES FOR TRAVERSING RAY TRACING ACCELERATION STRUCTURES

(71) Applicant: NVIDIA Corporation, Santa Clara, CA (US)

(72) Inventors: Gregory Muthler, Austin, TX (US); John Burgess, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,954

(22) Filed: Jun. 1, 2022

(65) Prior Publication Data
US 2022/0292760 A1 Sep. 15, 2022

Related U.S. Application Data

(63) Continuation of application No. 16/898,980, filed on Jun. 11, 2020, now Pat. No. 11,380,041.

(51) Int. Cl.
*G06T 15/06* (2011.01)
*G06T 15/08* (2011.01)
(Continued)

(52) U.S. Cl.
CPC .......... *G06T 15/06* (2013.01); *G06F 9/30094* (2013.01); *G06F 9/5027* (2013.01);
(Continued)

(58) Field of Classification Search
CPC ....... G06T 15/06; G06T 15/08; G06T 17/005; G06T 2210/12; G06T 13/20; G06F 9/30094; G06F 9/5027
See application file for complete search history.

(56) References Cited

U.S. PATENT DOCUMENTS 8,072,454 B1 12/2011 Aila
9,466,091 B2 10/2016 Clohset
(Continued)

FOREIGN PATENT DOCUMENTS

CN 103578131 A 2/2014
CN 105469440 A 4/2016
(Continued)

OTHER PUBLICATIONS

Foley, James D., et al., "Computer Graphics: Principles and Practice," 2nd Edition Addison-Wesley 1996 and 3$^{rd}$ Edition Addison-Wesley 2014.
(Continued)

*Primary Examiner* — Daniel F Hajnik
(74) *Attorney, Agent, or Firm* — Nixon & Vanderhye, PC

(57) ABSTRACT

Enhanced techniques applicable to a ray tracing hardware accelerator for traversing a hierarchical acceleration structure are disclosed. For example, traversal efficiency is improved by combining programmable traversals based on ray operations with per-node static configurations that modify traversal behavior. The per-node static configurations enable creators of acceleration data structures to optimize for potential traversals without necessarily requiring detailed information about ray characteristics and ray operations used when traversing the acceleration structure. Moreover, by providing for selective exclusion of certain nodes using per-node static configurations, less memory is needed to express an acceleration structure that includes, for example, different geometric levels of details corresponding to a single object.

18 Claims, 25 Drawing Sheets

(51) Int. Cl.
  *G06T 17/00*  (2006.01)
  *G06F 9/50*  (2006.01)
  *G06F 9/30*  (2018.01)
(52) U.S. Cl.
  CPC .......... *G06T 15/08* (2013.01); *G06T 17/005* (2013.01); *G06T 2210/12* (2013.01)

(56) References Cited

U.S. PATENT DOCUMENTS

| | | |
|---|---|---|
| 9,552,664 B2 | 1/2017 | Laine et al. |
| 9,569,559 B2 | 2/2017 | Karras et al. |
| 9,582,607 B2 | 2/2017 | Laine et al. |
| 10,025,879 B2 | 7/2018 | Karras et al. |
| 10,235,338 B2 | 3/2019 | Laine et al. |
| 10,580,196 B1 | 3/2020 | Muthler et al. |
| 10,740,952 B2 | 8/2020 | Laine et al. |
| 10,825,230 B2 | 11/2020 | Laine et al. |
| 2008/0122845 A1 | 5/2008 | Brown |
| 2008/0192050 A1 | 8/2008 | Schardt |
| 2015/0089156 A1 | 3/2015 | Clohset |
| 2016/0070767 A1 | 3/2016 | Karras et al. |
| 2016/0070820 A1 | 3/2016 | Laine et al. |
| 2016/0071234 A1 | 3/2016 | Lehtinen et al. |
| 2019/0156550 A1 | 5/2019 | Stanard |
| 2019/0197761 A1 | 6/2019 | Saleh |
| 2019/0303725 A1 | 10/2019 | Gurvich |
| 2020/0050451 A1 | 2/2020 | Babich et al. |
| 2020/0050550 A1 | 2/2020 | Muthler et al. |
| 2020/0051315 A1 | 2/2020 | Laine et al. |
| 2020/0051318 A1 | 2/2020 | Muthler et al. |
| 2021/0158597 A1 | 5/2021 | Hagland |

FOREIGN PATENT DOCUMENTS

| | | |
|---|---|---|
| CN | 107408312 A | 11/2017 |
| CN | 110827385 A | 2/2020 |
| EP | 3435336 A | 1/2019 |
| GB | 201721702 | 2/2018 |
| WO | 2019036098 A1 | 2/2019 |

OTHER PUBLICATIONS

Appel, Arthur, "Some techniques for shading machine renderings of solids," AFIPS Conference Proceedings: 1968 Spring Joint Computer Conference, 9 pages.

Whitted, Turner, "An Improved Illumination Model for Shaded Display," Communications of the ACM, vol. 23, No. 6, Jun. 1990, pp. 343-349.

Kajiya, James T., "The Rendering Equation," SIGGRAPH, vol. 20, No. 4, 1986, pp. 143-150.

Hery, Christophe, et al., "Towards Bidirectional Path Tracing at Pixar," 2016, 20 pages.

Parker, Steven G., et al., "OptiX: A General Purpose Ray Tracing Engine," ACM Transactions on Graphics, vol. 29, Issue 4, Article No. 66, Jul. 2010, 13 pages.

Woop, Sven, "A Ray Tracing Hardware Architecture for Dynamic Scenes," Thesis, Universitat des Saarlandes, 2004, 100 pages.

Lefrancois et al., NVIDIA Vulkan Ray Tracing Tutorial, Dec. 2019, https://developer.nvidia.com/rtx/raytracing.

Chinese Office Action for Application No. 202110653516.6 dated Jul. 26, 2023, 4 pages.

Chinese Office Action for Application No. 202110653516.6 dated Jun. 1, 2023, 12 pages.

Example Ray Tracing Shading Pipeline

FIG. 10 TRAVERSAL COPROCESSOR

TTU Processing

| | rayOp | name | test |
|---|---|---|---|
| const ops | bit pattern 1 | ALWAYS | always TRUE |
| | bit pattern 2 | NEVER | always FALSE |
| integer ops | bit pattern 3 | EQUAL | A == rval & B |
| | bit pattern 4 | NOTEQUAL | A != rval & B |
| | bit pattern 5 | LESS | A < rval & B |
| | bit pattern 6 | LEQUAL | A <= rval & B |
| | bit pattern 7 | GREATER | A > rval & B |
| | bit pattern 8 | GEQUAL | A >= rval & B |
| t compare ops | bit pattern 9 | reserved | |
| | bit pattern 10 | reserved | |
| | bit pattern 11 | reserved | |
| | bit pattern 12 | reserved | |
| | bit pattern 13 | FLT_TMIN_LESS | tmin < A * rval + B |
| | bit pattern 14 | FLT_TMIN_GEQUAL | tmin >= A * rval + B |
| | bit pattern 15 | FLT_TMAX_LESS | tmax < A * rval + B |
| | bit pattern 16 | FLT_TMAX_GEQUAL | tmax >= A * rval + B |

FIG. 15B

| mode flag | node type | test result | action |
|---|---|---|---|
| in_f | instance node mode | (rayOp fail) | 0=process in TTU, 1=cull, 2=return as node ref, 3=return to SM |
| in_p | instance node mode | (rayOp pass) | 0=process in TTU, 1=cull, 2=return as node ref, 3=return to SM |
| ir_f | item range mode | (rayOp fail) | 0=return to SM, 1=cull, 2=return as node ref |
| ir_p | item range mode | (rayOp pass) | 0=return to SM, 1=cull, 2=return as node ref |
| tr_f | triangle range mode | (rayOp fail) | 0=process in RTT, 1=cull, 2=return as node ref, 3=return to SM |
| tr_p | triangle range mode | (rayOp pass) | 0=process in RTT, 1=cull, 2=return as node ref, 3=return to SM |
| ch_f | child complet mode | (rayOp fail) | 0=traverse, 1=cull, 2=return as node ref |
| ch_p | child complet mode | (rayOp pass) | 0=traverse, 1=cull, 2=return as node ref |

| | | | |
|---|---|---|---|
| at_f | alpha triangle hit mode in RTT | (rayOp fail) | 0=process as usual, 1=cull, 2=treat as if opaque |
| at_p | alpha triangle hit mode in RTT | (rayOp pass) | 0=process as usual, 1=cull, 2=treat as if opaque |
| ot_f | opaque triangle hit mode in RTT | (rayOp fail) | 0=process as usual, 1=cull, 2=treat as if alpha |
| ot_p | opaque triangle hit mode in RTT | (rayOp pass) | 0=process as usual, 1=cull, 2=treat as if alpha |

FIG. 15C

Example Process To Generate an Image

ENHANCED TECHNIQUES FOR TRAVERSING RAY TRACING ACCELERATION STRUCTURES

CROSS-REFERENCE TO RELATED PATENTS AND APPLICATIONS

This application is a continuation application of, and claims priority to, U.S. application Ser. No. 16/898,980 filed Jun. 11, 2020, the entire contents of which is herein incorporated by reference.

This application is related to the following commonly-assigned US patents and patent applications, the entire contents of each of which are incorporated by reference:
U.S. application Ser. No. 16/898,980 titled "Enhanced Techniques for Traversing Ray Tracing Acceleration Structures" filed Jun. 11, 2020;
U.S. application Ser. No. 14/563,872 titled "Short Stack Traversal of Tree Data Structures" filed Dec. 8, 2014;
U.S. Pat. No. 9,582,607 titled "Block-Based Bounding Volume Hierarchy";
U.S. Pat. No. 9,552,664 titled "Relative Encoding For A Block-Based Bounding Volume Hierarchy";
U.S. Pat. No. 9,569,559 titled "Beam Tracing";
U.S. Pat. No. 10,025,879 titled "Tree Data Structures Based on a Plurality of Local Coordinate Systems";
U.S. application Ser. No. 14/737,343 titled "Block-Based Lossless Compression of Geometric Data" filed Jun. 11, 2015;
U.S. patent application Ser. No. 16/101,066 titled Method for Continued Bounding Volume Hierarchy Traversal on Intersection Without Shader Intervention;
U.S. patent application Ser. No. 16/101,109 titled "Method for Efficient Grouping of Cache Requests for Datapath Scheduling";
U.S. patent application Ser. No. 16/101,247 titled "A Robust, Efficient Multiprocessor-Coprocessor Interface";
U.S. patent application Ser. No. 16/101,180 titled "Query-Specific Behavioral Modification of Tree Traversal";
U.S. patent application Ser. No. 16/101,148 titled "Conservative Watertight Ray Triangle Intersection";
U.S. patent application Ser. No. 16/101,196 titled "Method for Handling Out-of-Order Opaque and Alpha Ray/Primitive Intersections"; and
U.S. patent application Ser. No. 16/101,232 titled "Method for Forward Progress and Programmable Timeouts of Tree Traversal Mechanisms in Hardware".

FIELD

The present technology relates to computer graphics, and more particularly to ray tracers. More particularly, the technology relates to hardware acceleration of computer graphics processing including but not limited to ray tracing. The example non-limiting technology herein also relates to efficient and flexible ray intersection tests that provide for selective execution of programmable ray operations.

BACKGROUND & SUMMARY

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $1/30^{th}$ or $1/60^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics. Ray tracing was developed at the end of the 1960's and was improved upon in the 1980's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit— which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". Ray tracing may also be used as the basic technique to accurately simulate light transport in physically-based rendering algorithms such as path tracing, photon mapping, Metropolis light transport, and other light transport algorithms.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US 20160070820; US 20160070767; and the other US patents and patent applications cited above.

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, however, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

FIGS. 1A-1C illustrate ray tracing intersection testing in the context of a bounding volume 110 including geometric mesh 120. FIG. 1A shows a ray 102 in a virtual space including bounding volumes 110 and 115. To determine whether the ray 102 intersects geometry in the mesh 120, each geometric primitive (e.g., triangle) could be directly tested against the ray 102. But to accelerate the process (since the object could contain many thousands of geometric primitives), the ray 102 is first tested against the bounding volumes 110 and 115. If the ray 102 does not intersect a bounding volume, then it does not intersect any geometry inside of the bounding volume and all geometry inside the bounding volume can be ignored for purposes of that ray. Because in FIG. 1A the ray 102 misses bounding volume 110, any geometry of mesh 120 within that bounding volume need not be tested for intersection. While bounding volume 115 is intersected by the ray 102, bounding volume 115 does not contain any geometry and so no further testing is required.

On the other hand, if a ray such as ray 104 shown in FIG. 1B intersects a bounding volume 110 that contains geometry, then the ray may or may not intersect the geometry inside of the bounding volume so further tests need to be performed on the geometry itself to find possible intersections. Because the rays 104, 106 in FIGS. 1B and 1C intersect a bounding volume 110 that contains geometry, further tests need to be performed to determine whether any (and which) of the primitives inside of the bounding volume are intersected. In FIG. 1B, further testing of the intersections with the primitives would indicate that even though the ray 104 passes through the bounding volume 110, it does not intersect any of the geometry the bounding volume encloses (alternatively, as mentioned above, bounding volume 110 could be further volumetrically subdivided so that a bounding volume intersection test could be used to reveal that the ray does not intersect any geometry or more specifically which geometric primitives the ray may intersect).

FIG. 1C shows a situation in which the ray intersects bounding volume 110 and contains geometry that ray 106 intersects. To perform real time ray tracing, an intersection tester tests each geometric primitive within the intersected bounding volume 110 to determine whether the ray intersects that geometric primitive.

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In ray tracing, the time for finding the closest (or for shadows, any) intersection for a ray is typically order O(log n) for n objects when such an acceleration data structure is used. For example, AABB bounding volume hierarchies (BVHs) of the type commonly used for modern ray tracing acceleration data structures typically have an O(log n) search behavior.

The BVH acceleration data structure represents and/or references the 3D model of an object or a scene in a manner that will help assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

NVIDIA's RTX platform includes a ray tracing technology that brings real-time, cinematic-quality rendering to content creators and game developers. See https://developer.nvidia.com/rtx/raytracing. In many or most implementations including NVIDIA RT Cores, the bounding volumes such as shown in FIG. 1A-1C use axis-aligned bounding boxes ("AABBs"), which can be compactly stored and easily tested for ray intersection. If a ray intersects against the bounding box of the geometry, then the underlying geometry is then tested as well. If a ray does not intersect against the bounding box of the geometry though, then that underlying geometry does not need to be tested. As FIGS. 1A-1C show, a hierarchy of AABB's is created to increase the culling effect of a single AABB bounding box test. This allows for efficient traversal and a quick reduction to the geometry of interest.

Nvidia's RTX platform introduced programmable ray operations that can change traversal in hardware of an acceleration data structure in a highly dynamic, query-specific manner Using such ray operations, each ray query specifies test parameters, a test opcode and a mapping of test results to actions. In an example ray tracing implementation, the default behavior of a ray traversing a bounding volume hierarchy is changed in accordance with results of a test performed using the test opcode and test parameters specified in the ray data structure and another test parameter specified in nodes of the acceleration data structure. See e.g., US 2020/0051315.

The ray tracing API extensions for DirectX Raytracing (DXR) Functional Specification v1.12 (Apr. 6, 2020) include an "Instance Masking" API feature for an acceleration data structure that, for example, enables certain kinds of culling in the acceleration data structure. The DXR specification provides for an instance mask to be specified for an instance node in an acceleration structure, and for an instance node inclusion mask to be specified for a ray. During traversal of an acceleration structure with the ray, only those nodes in the acceleration structure that have an instance mask that has a predetermined value relative to the instance inclusion mask of the ray are further traversed and/or intersection tested. That is, the mask specified in the ray is intended to match, according to a predetermined logical operation (e.g. AND), nodes that are to be included in the traversal. Nvidia's RTX platform used the programmable ray operations mentioned above to support the instance masking function in DXR. However, the RTX platform requires that, in order for the programmable ray operations to be used for instance masking, all instance nodes in the acceleration structure are configured with an instance mask that can be logically compared with the instance inclusion mask in the ray.

The requirement, such as that described above, to have all nodes or all nodes of a certain type, configured in a certain way in order to have the programmable ray operation apply to some nodes can reduce the flexibility of the programmable ray operations. Thus, further improvements of the programmable ray operation capability are desirable.

BRIEF DESCRIPTION OF THE DRAWINGS

FIGS. 15B and 15C show tables of values for certain ray opcodes and ray parameters for use in programmable ray operations, according to some embodiments.

DETAILED DESCRIPTION OF NON-LIMITING EMBODIMENTS

Figure 1A:
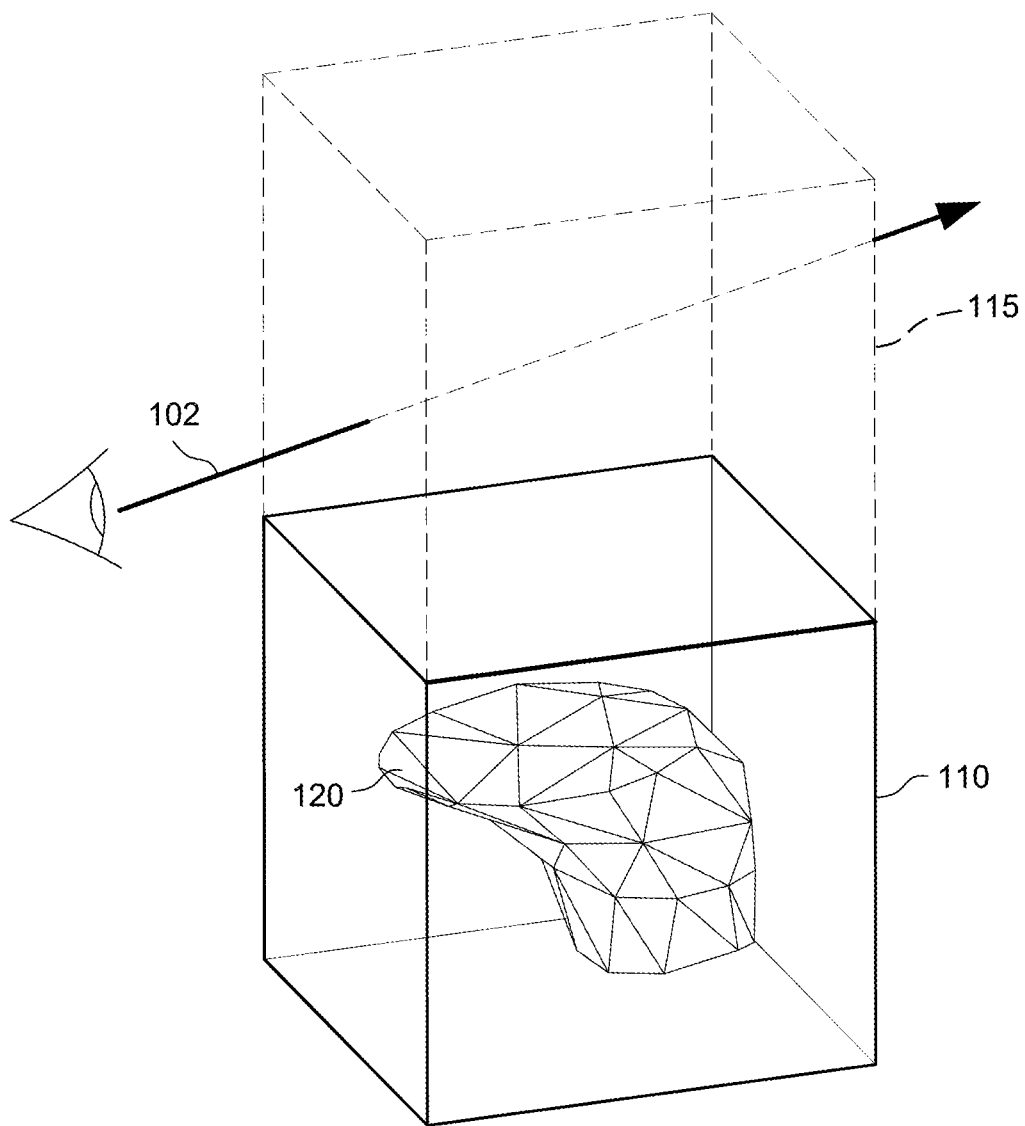
FIGS. 1A-1C show example simplified ray tracing tests to determine whether the ray passes through a bounding volume containing geometry and whether the ray intersects geometry within the bounding volume.
Figure 1B:
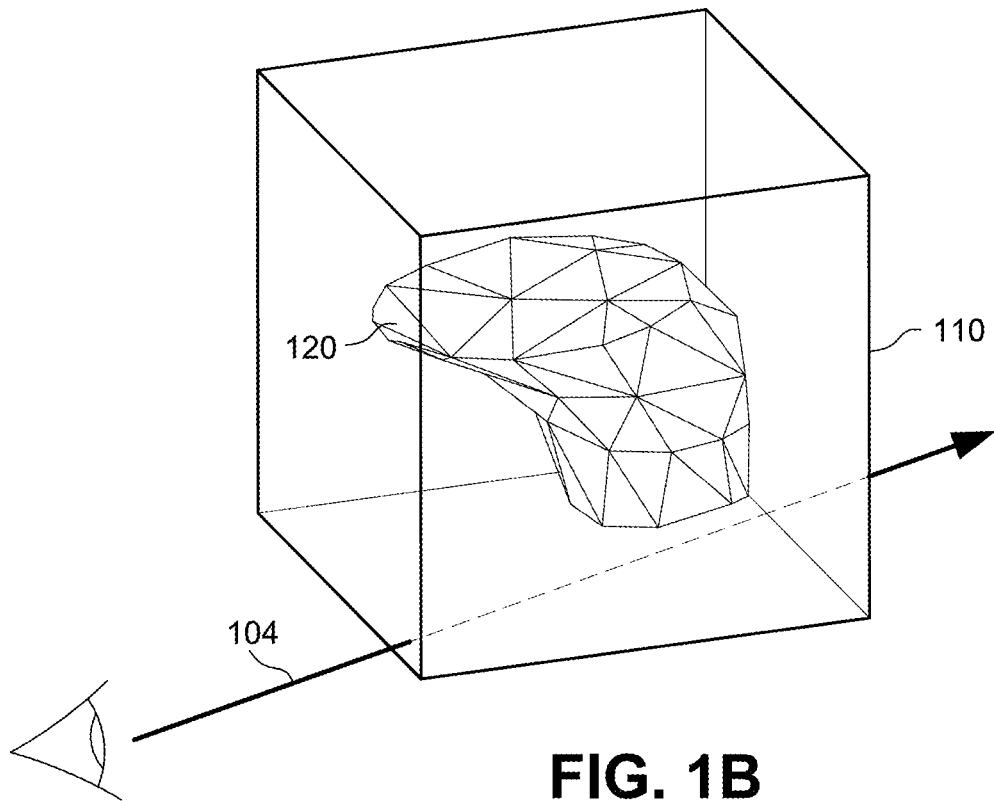
Figure 1C:
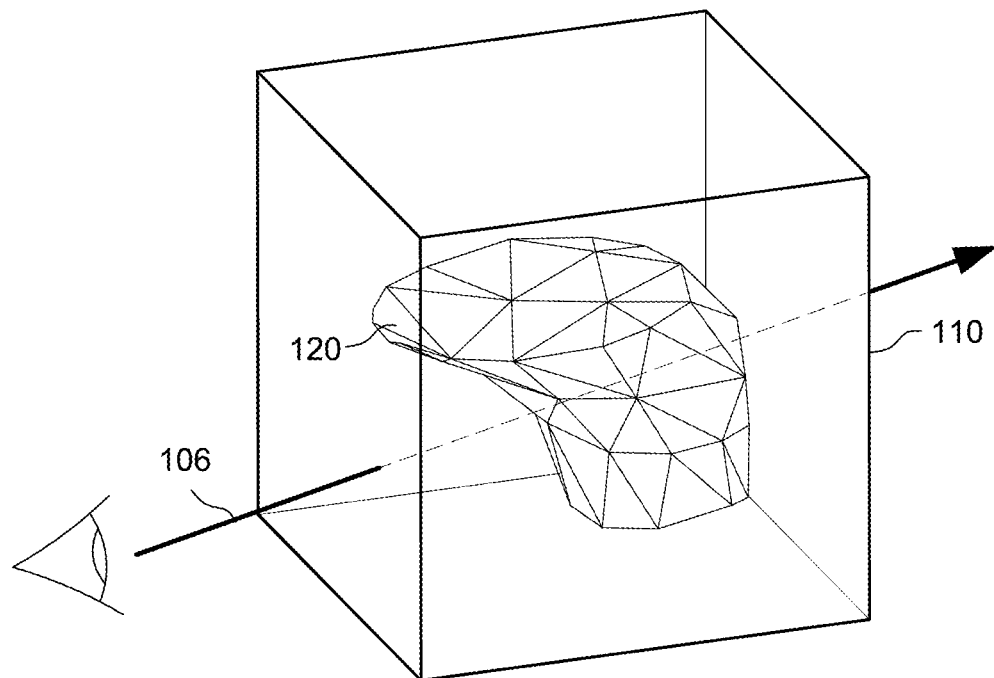

The already highly efficient ray tracing capabilities of the Nvidia RTX technology, which provides hardware-accelerated testing of rays against the hierarchically-arranged bounding boxes that encompass object geometries in a scene and also the underlying object geometries as well, can be improved even more by, for example, further improving the flexibility and efficiency of the programmable ray operation.

One aspect of further improving the programmable ray operation capability is made by providing for the instance masking capability, which was previously tied to the programmable ray operation, to be separated from the programmable ray operation, thereby freeing the programmable ray operation capability for implementing other functions. The application U.S. Ser. No. 16/897,909 describes ray traversal with a combination of instance masking and programmable ray operation. In another improvement of the capabilities of the RTX platform, the developer is provided with the capability to rebuild parts of the scene on a frame-by-frame basis in that the same top level acceleration structure can be reused with relatively small modifications for changing scenes in order to reduce false positives among detected ray-bounding volume intersections in a "top-level instancing" capability described in application U.S. Ser. No. 16/897,745.

Whereas new capabilities such as but not limited to those described in the paragraph above enable a more flexible programmable ray operation and also provides developers with more flexibility with fine tuning the acceleration structures to particular scenes and user views, the inventors realized that the programmable ray operation can be even further improved by reducing the requirements for the acceleration structure to be specifically tailored to particular rays or ray types and also by allowing for some nodes to be traversed without being subjected to the programmable ray operation. By reducing the requirements for the acceleration structure to be specifically tailored to particular rays or ray types, in other words, by lessening the amount of coordination that must occur between the developer of the acceleration data structure and the programmers implementing the ray operations, more flexible and possibly more efficient use of both acceleration structures and rays is enabled. By allowing certain nodes in the acceleration data structure to be traversed without being subjected to the programmable ray operation the memory requirements for the acceleration data structure are reduced. Example embodiments of this disclosure lessen the amount of coordination that must occur between the developer of the acceleration data structure and the programmers implementing the ray operations, and also allow certain nodes in the acceleration data structure to be traversed without being subjected to the programmable ray operation.

Certain example embodiments of this disclosure provide a ray tracing coprocessor hardware device that enables hardware-accelerated ray tracing in which respective nodes of the acceleration data structure can be configured to selectively ignore the programmable ray operation, i.e. the example embodiments allow for respective nodes in the acceleration data structure to include a "force ray always" (FRA) flag which is considered by the coprocessor in order to either ignore or perform the programmable ray operation accordingly. The programmable ray operation may be specified in an opcode included in the ray. In some implementations, the programmable opcode-based ray operation can be implemented as described in U.S. patent application Ser. No. 16/101,180 titled "Query-Specific Behavioral Modification of Tree Traversal", which is hereby incorporated by reference in its entirety.

Figure 2A:
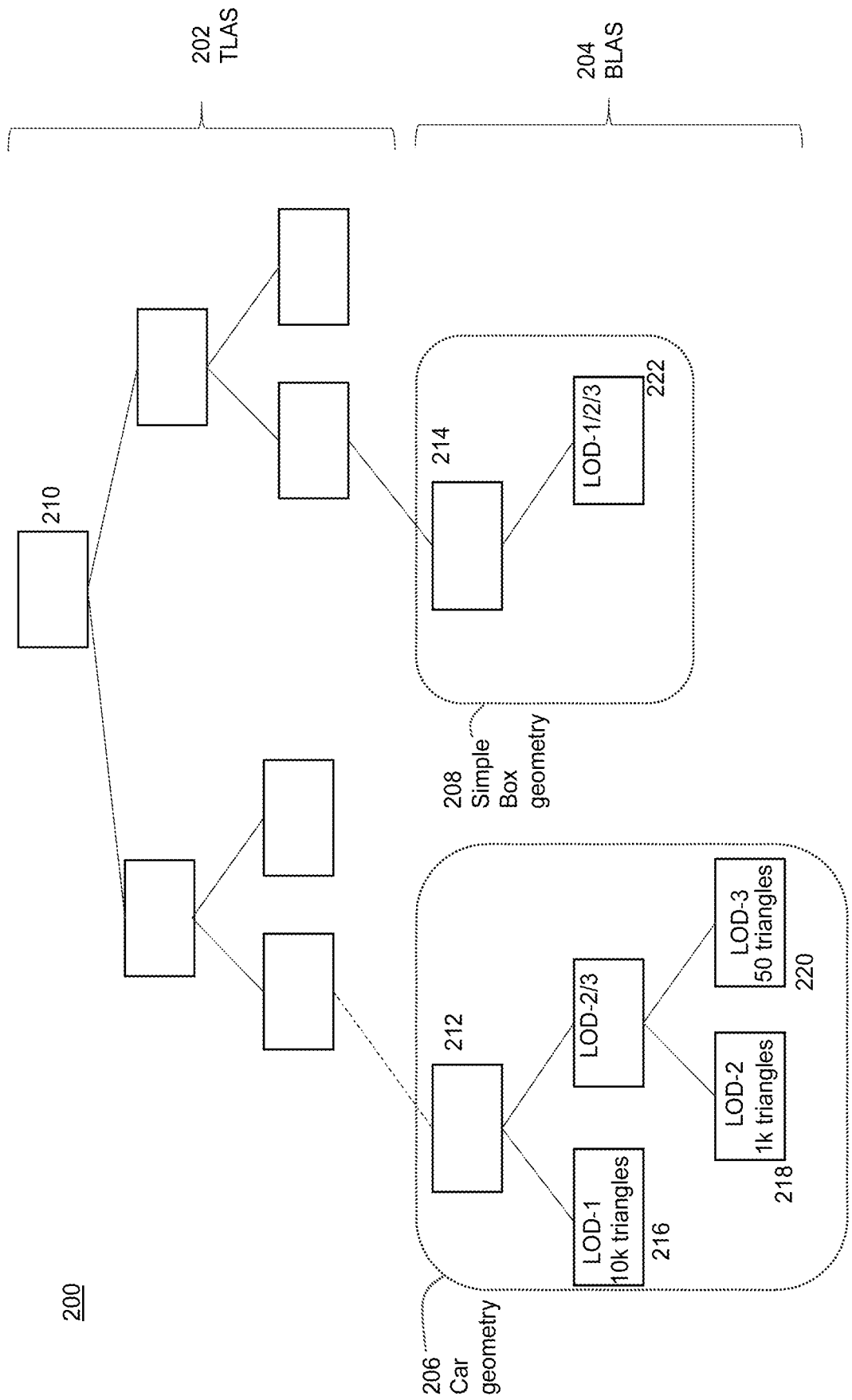
FIG. 2A shows a part of an example acceleration data structure.

FIG. 2A illustrates a portion of an example acceleration data structure 200. As described in more detail below in relation to construction of BVHs, the acceleration data structure 200 includes top-level acceleration structure (TLAS) 202 and a bottom-level acceleration structure (BLAS) 204. Although a scene can typically be represented by one TLAS tree, the BLAS for the scene may comprise many separate acceleration structures each encompassing one or more objects in the scene. Each separate BLAS tree, for example, may encompass one or more objects in a particular coordinate space, and each such BLAS tree may be connected to the TLAS by an instance node which specifies a transform from the world coordinate space in which the scene and the TLAS is defined to the object coordinate space of that respective object. In the example shown in FIG. 2A, the BLAS for the scene incorporates an acceleration structure representing the geometry of a car (car geometry 206) and another acceleration structure representing the geometry of a simple object such as a box (simple box geometry 208). Some objects, typically objects that have a complex structure or design, may have several models, each defined in a different level of detail (LOD). Other simpler objects, may have only a single model. For example, the car geometry 206 has three separate models defining the same car—an LOD 1 model 216 using about 10000 triangles, an LOD 2 model 218 using about 1000 triangles, and an LOD 3 model 220 using about 50 triangles. These models of the car are arranged in a BLAS tree rooted at node 212. The simple box is defined by a model 222 as the only model available for that simple box, which is arranged in a BLAS tree rooted at 214. When the acceleration data structure for the scene is constructed, the BLAS tree 206 and the BLAS tree 208 are connected by their respective root nodes 212 and 214 to the TLAS rooted at node 210.

Ray traversing such as that provided by Nvidia's RTX platform, provides for programmable ray operations that allow each ray to, among other things, select the LOD of an object that it tests for intersections. However, the ray traversing implementation of the RTX platform, requires that, if a programmable ray operation were to apply to one BLAS, every BLAS in that acceleration structure also supports that programmable ray operation. That is, for example, if a programmable ray operation is used to select the LOD in one BLAS, then every BLAS in that acceleration must be configured to include multiple LOD and permit that programmable ray operation to be performed. If only some BLAS in an acceleration data structure have models of an object or objects in multiple LOD, while other BLAS in the acceleration structure do not include models in multiple LOD, then the programmable ray operation for selecting the LOD cannot be used on that acceleration structure on the RTX platform. For example, on the RTX platform, the ray operation to select the LOD cannot be optimally performed for the acceleration structure of FIG. 2A. As can be seen in FIG. 2A, whereas multiple models for different LOD are available in the acceleration structure 200 for the car geometry 206, only a single model is available for the simple box 208. On the RTX platform, the programmable ray operation for selecting LOD cannot be optimally performed on acceleration data structures such as the acceleration data structure 200.

Figure 2B:
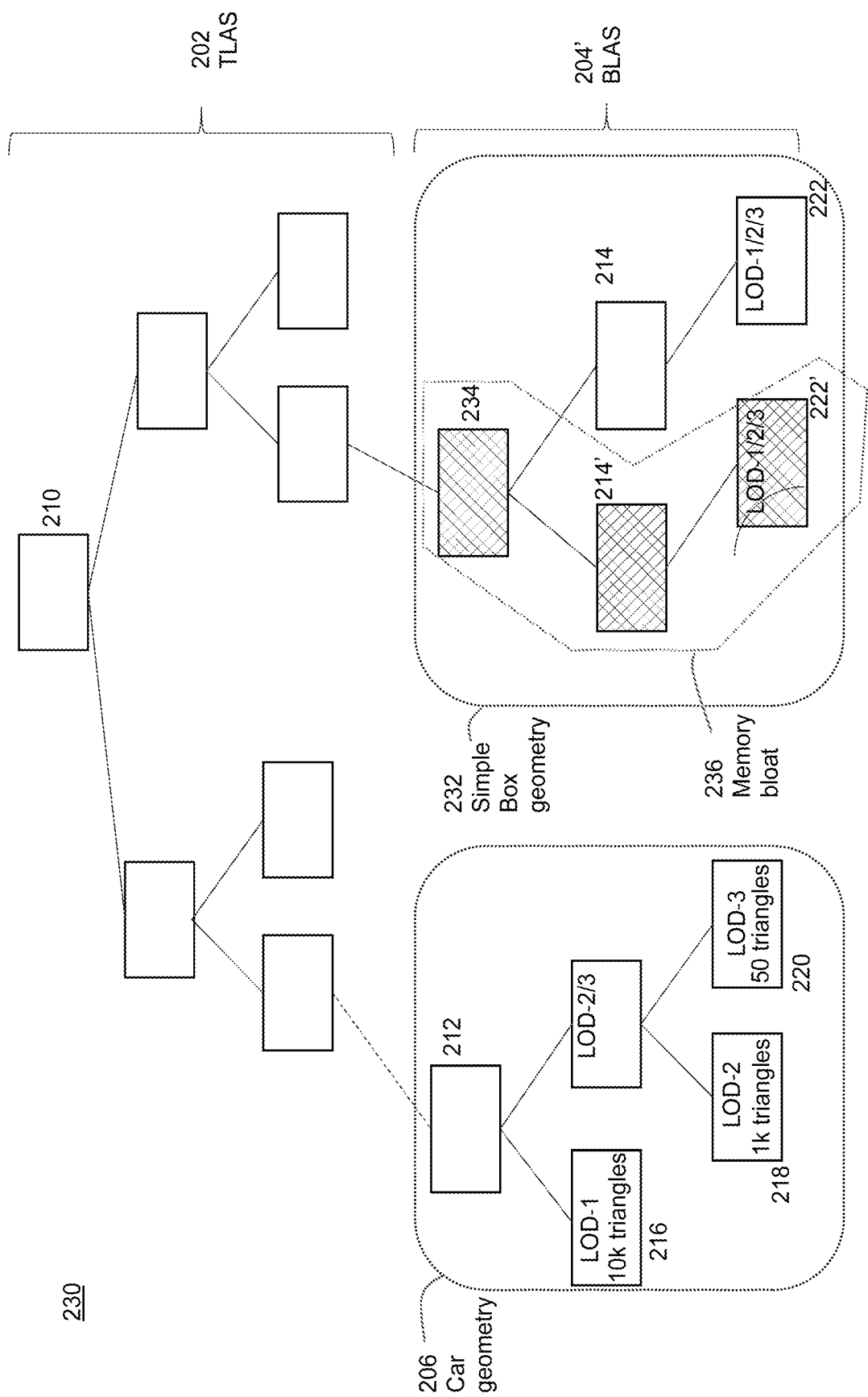
FIG. 2B shows a manner in which the example acceleration data structure of FIG. 2A can be modified to support certain programmable ray operations at the expense of increased memory use.

For the reasons described in the above paragraph, and for other reasons too, various inefficiencies are sometimes introduced in order to improve the efficiency and/or flexibility of the programmable ray operation capabilities on the RTX platform. For example, in order to preserve the capability of performing the programmable ray operation in many types of scenes, sometimes numerous nodes or entire portions of acceleration data structures that are likely to be unused (e.g. not be traversed by a ray) are added to the acceleration data structure for a scene. FIG. 2B illustrates an example.

The acceleration data structure 230 shown in FIG. 2B may be identical to the acceleration data structure 200 shown in FIG. 2A except for the arrangement of the simple box geometry 208 of the acceleration data structure 200. That is, the TLAS 202 in acceleration structure 230 may be identical to TLAS 202 in the acceleration structure 200, and the BLAS 204' may be identical to BLAS 204 except for the arrangement of the simple box geometry 208. The tree for the simple box geometry 208 now, represented in FIG. 2B as simple box geometry 232, includes a new root node 234 introduced as the parent of the original simple box geometry tree rooted at node 214, which was the root of the simple box geometry BLAS tree in FIG. 2A. As adapted, the new simple box geometry BLAS root node 234 has two child nodes— the tree rooted at the original BLAS root node 214 and the root 214' of a duplicate of the tree rooted at 214. The nodes 214' and 222' are identical to nodes 214 and 222 of the original BLAS tree, except that one of the nodes 214 and 214' has its ray operation control parameters inverted while the other does not (e.g. one has the invert bit set for the "rval", and the other does not; rval and invert bit are described in relation to FIG. 17).

Since the corresponding root node of the BLAS now include multiple child nodes, the programmable ray operation for selecting an LOD can be performed for the simple box geometry 208 too. When the programmable ray operation is performed on the nodes 214 and 214', since one has the inverse of the ray operation control parameter stored in the other, the ray operation succeeds only on one of the nodes 214 and 214', and thus it is guaranteed that the ray traverses only one of the trees. In this manner, even if the BLAS as provided by the developer may not include models of multiple LODs for some of the objects in the scene, a programmable ray operation for dynamically selecting the most appropriate LOD for one or more rays can be used on the acceleration structure 200'.

However, the newly introduced nodes—the duplicated nodes 214' and 222' and the new BLAS root 234—introduce memory bloat 236 to the acceleration data structure 200. The newly added portion 236 merely leads to the same model 222, or a duplicate 222' of the model 222. While only the memory bloat associated with one BLAS tree, which also happens to be a small tree, is shown in FIG. 2B, it is easily understood that the amount of memory bloat can be much larger. For example, if each BLAS tree is to be duplicated, the additional memory bloat would be at least twice the size of all the BLAS trees because of the node to node duplication of the BLAS trees and the addition of a new root node for each BLAS. In addition to the memory bloat, this technique of duplicating a part of the acceleration data structure may also add inefficiencies to the traversal because two rays that otherwise might share cache lines within an "always" pass BVH have to load independent cache lines instead.

Figure 3:
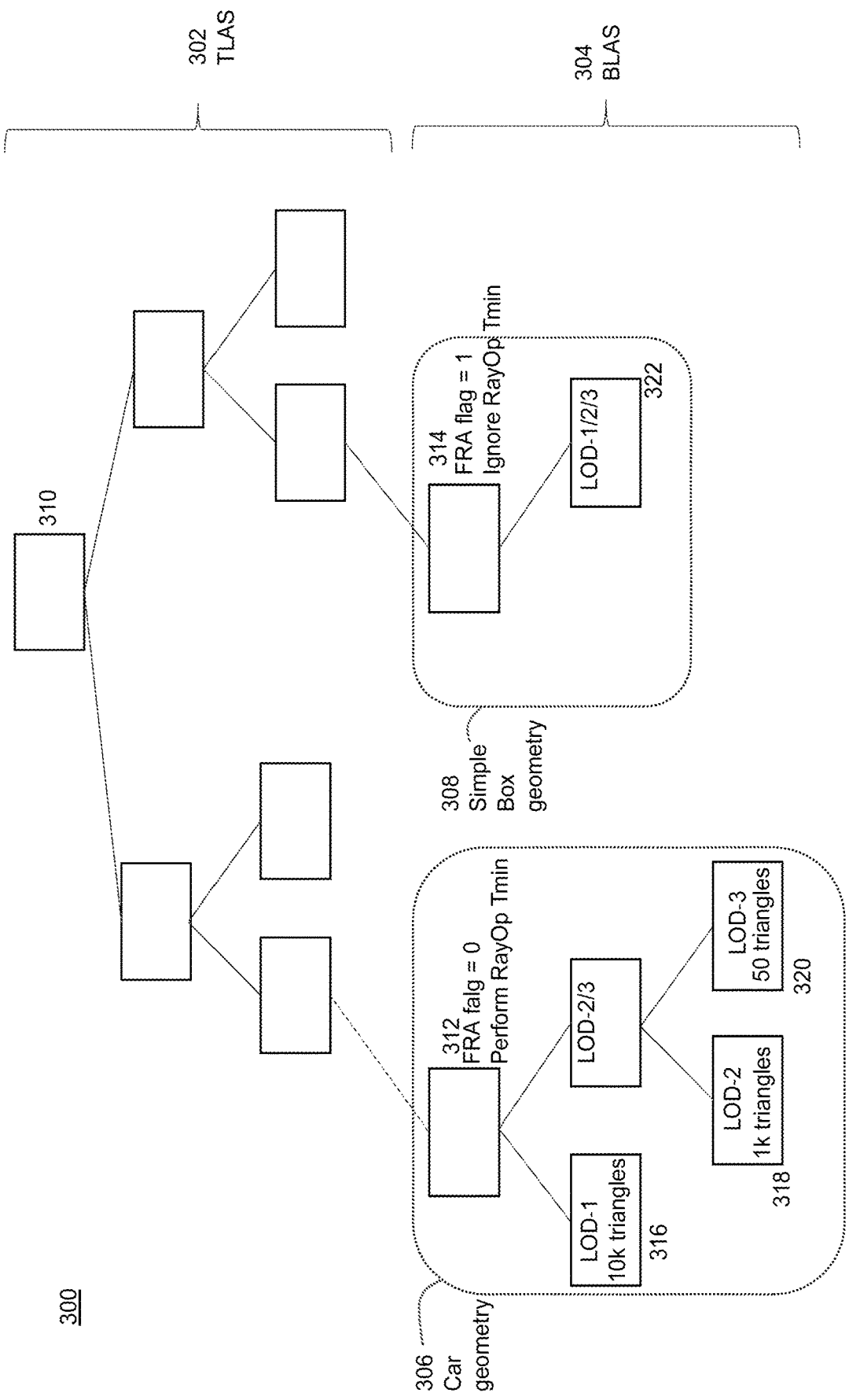
FIG. 3 illustrates acceleration data structure such as that shown in FIG. 2A, when adapted, in accordance with some embodiments, in a manner that does not cause the increased memory use as in the acceleration data structure shown in FIG. 2B.

FIG. 3 illustrates a portion of an acceleration data structure 300 configured according to some embodiments to provide for efficient and flexible programmable ray operations while also avoiding problems such as, for example, the memory bloat described in relation to FIG. 2B. More particularly, acceleration data structure 300 can be obtained by adapting the acceleration data structure 200 to include support for per-node static traversal behavior modification according to some embodiments. The acceleration data structure 300 may be identical to the acceleration data structure 200, with the exception that in acceleration data structure 300 some or all of the nodes include a "force ray always" (FRA) flag of which the value can be set in each node to ensure that the node, or in some embodiments, the node's child nodes, ignore the ray operation.

More specifically, the TLAS 302 rooted at node 310 may be identical in structure to the TLAS 202 rooted at node 210 and shown in FIG. 2A, and BLAS 304 may be identical in structure to the BLAS 204 shown in FIG. 2A. However, in contrast to the acceleration data structure of FIG. 2A, at least some nodes in acceleration data structure 300 are configured with the FRA flag. For example, FIG. 3 shows the root nodes 312 and 314 of each of the BLAS (306 and 308) are configured with the FRA flag in relation to a programmable ray operation. In the illustrated example, node 312 which connects the car geometry 306 to the TLAS is set with FRA=0 (FRA flag is not set) thereby indicating that the programmable ray operation is to be applied at node 312, and node 314 which connects the car geometry 308 to the TLAS is set with FRA=1 (FRA flag is set) thereby indicating that the programmable ray operation is to be ignored at node 314. When set, the FRA flag can be considered to make the complet or the node as "always" pass to ignore the programmable ray operation specified in the ray. Thus, when a ray which includes a ray operation, such as, for example, the Tmin ray operation (e.g. the "TMIN_LESS" ray operation described in relation to FIG. 17) that selects a particular LOD according to the t-distance of (e.g. the length of) the ray, is used to traverse the acceleration data structure 300, the ray operation will be performed at node 312 (because FRA=0), but will not be performed at node 314 (because FRA=1). This has the effect of allowing a ray with the programmable ray operation Tmin to traverse the acceleration data structure 300 in order to yield the desired selecting of the most appropriate LOD based on the length of the ray only when multiple models of different LOD are available for an object or group of objects, without requiring the addition of duplicated nodes and/or trees to the acceleration data structure causing memory bloat.

Figure 4:
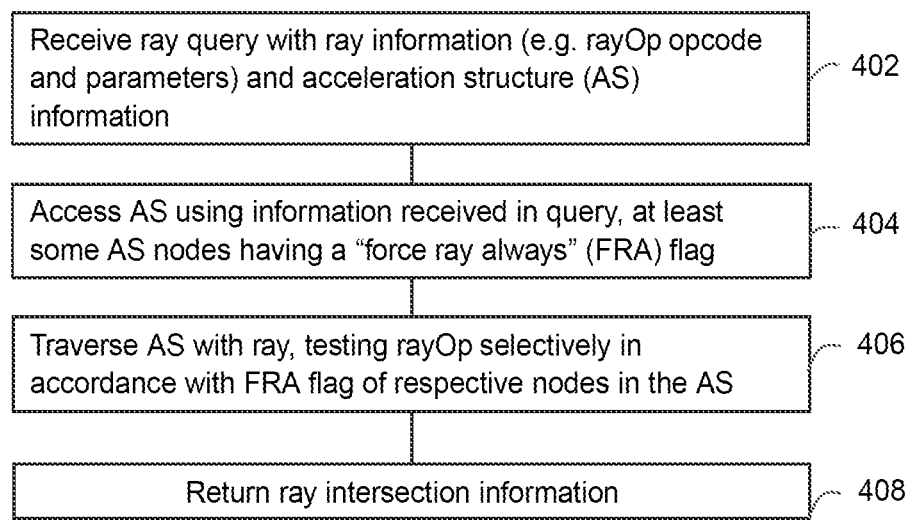
FIGS. 4, 5A and 5B show example processes for per-node static behavior modification of tree traversal in hardware, in accordance with some embodiments.
Figure 5A:
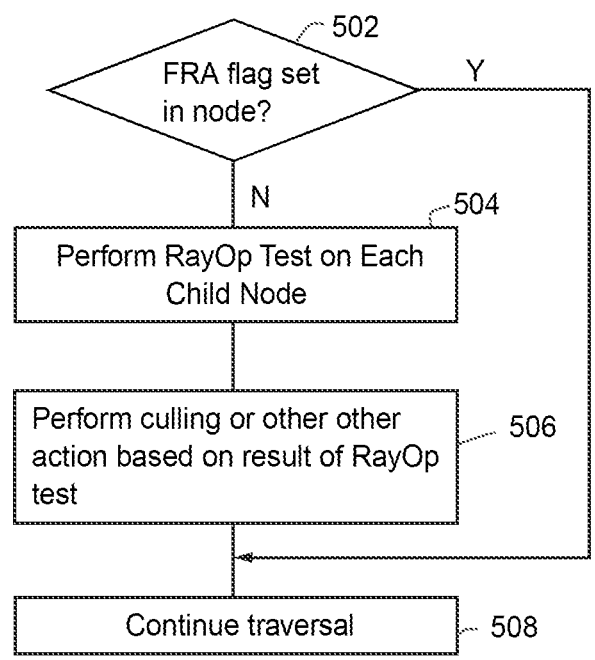
Figure 5B:
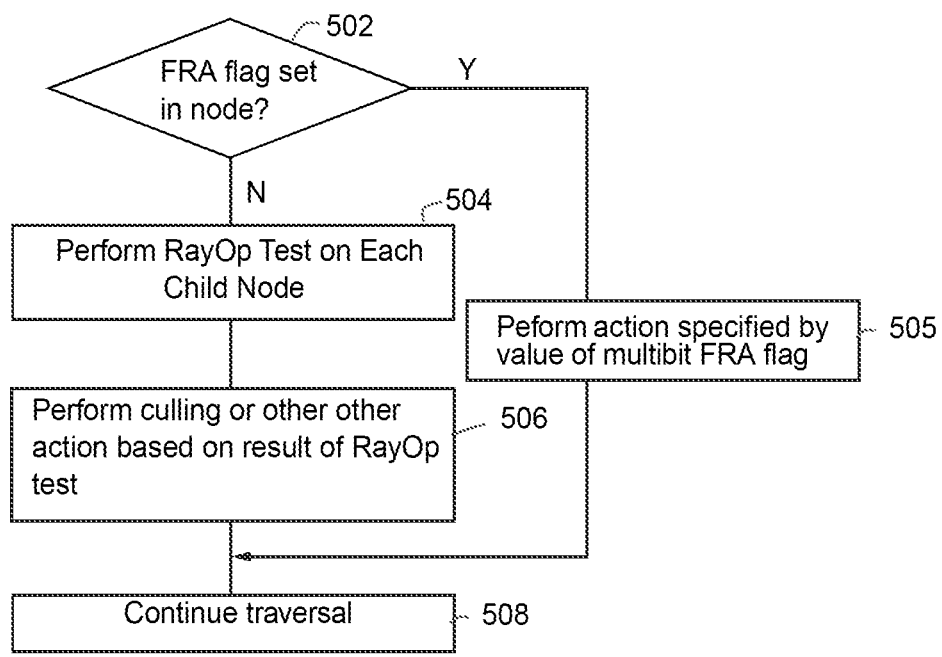

FIGS. 4, 5A and 5B show example processes for per-node static behavior modification of tree traversal in hardware, in accordance with some embodiments. FIG. 4 illustrates a process 400 for traversing an acceleration data structure by a ray in order to obtain intersection information for the ray, with the acceleration data structure being configured for per-node static behavior modification of the tree traversal. FIG. 5A illustrates more details of the effect on process 400 when the FRA flag has been set. FIG. 5B illustrates more details of the process 400 when the FRA flag specifies more than a binary decision (e.g., true/false or set/not set) as in FIG. 5A.

Process 400 may be performed in a real time ray tracing graphics system 700 (see FIG. 7) by the traversal coprocessor 738. Example components of the traversal coprocessor 738 according to some embodiments are shown in FIG. 10. A general description of ray traversal processing on the traversal coprocessor 738 is provided in relation to FIGS. 8-9, 11, 12A and 12B. Process 400 relates to certain aspects of the traversal processing in coprocessor 738 that involves the FRA flag and the programmable ray operation.

Figure 15A:
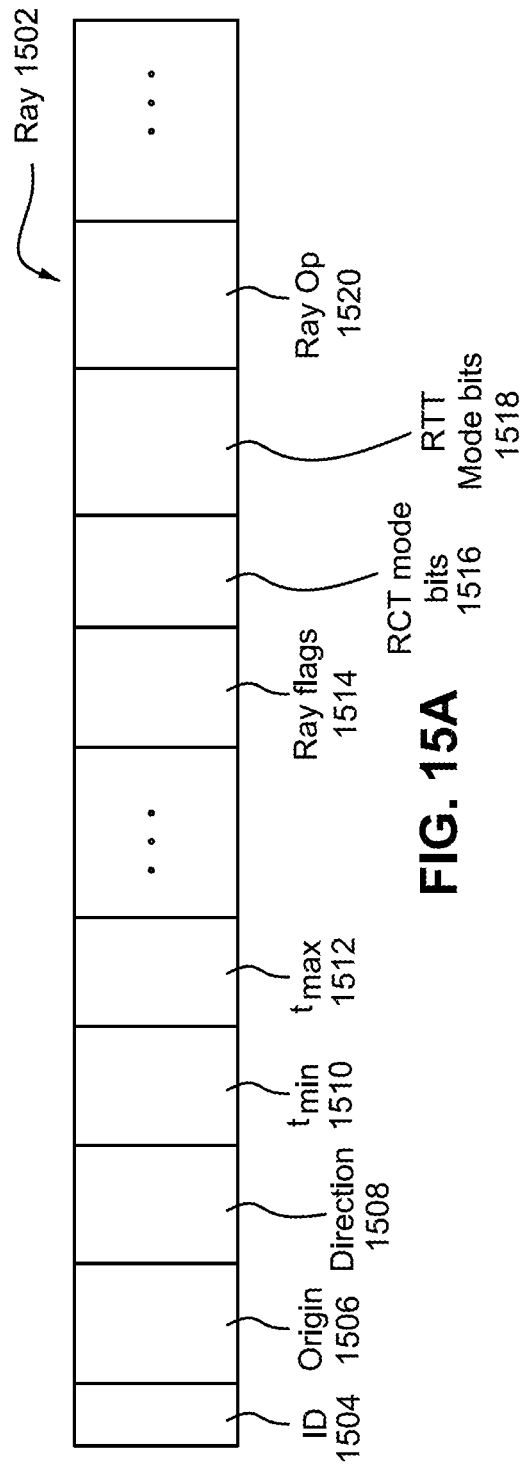
FIG. 15A shows an example ray query structure, according to some embodiments.

At operation 402, the traversal coprocessor 738 receives a ray query from the streaming multiprocessor (SM) 732. The ray query includes ray information for the ray, and acceleration structure information for the acceleration structure or the portion thereof to be traversed by the ray. The ray information includes ray operation information for a programmable ray operation, including, for example, an opcode defining the ray operation, and one or more parameters to be used in the ray operation. An example ray query data structure is shown in FIG. 15A, examples of opcodes are shown in FIG. 15B, and example ray parameters are shown in FIG. 15C.

Figure 16A:
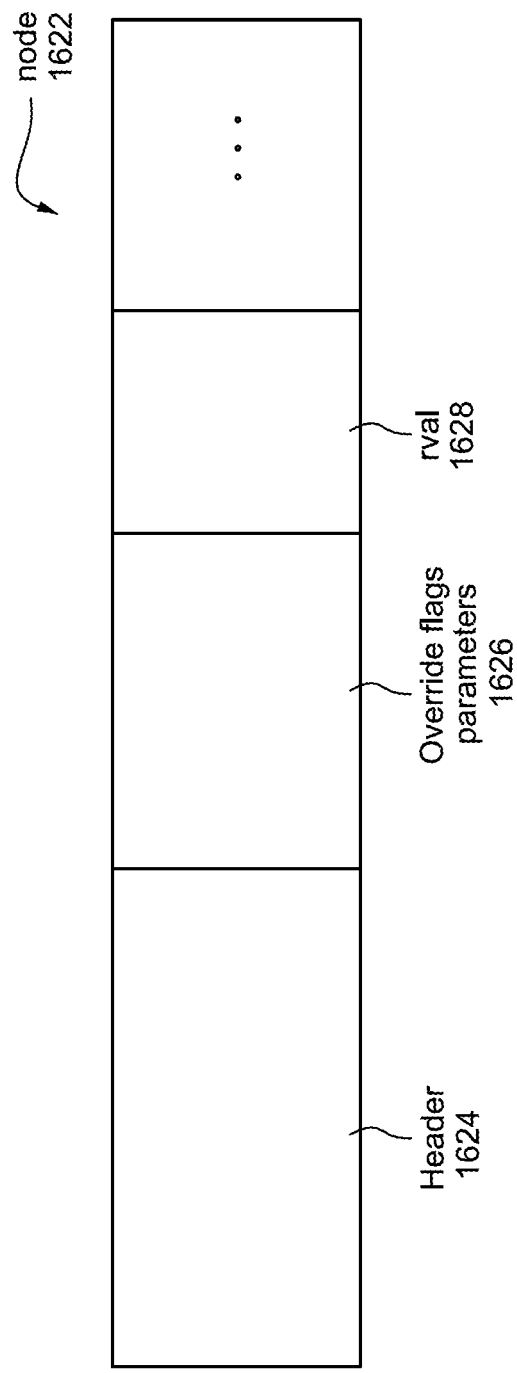
FIGS. 16A, 16B, and 16C show a data structure format of an example node structure, according to some embodiments.
Figure 16B:
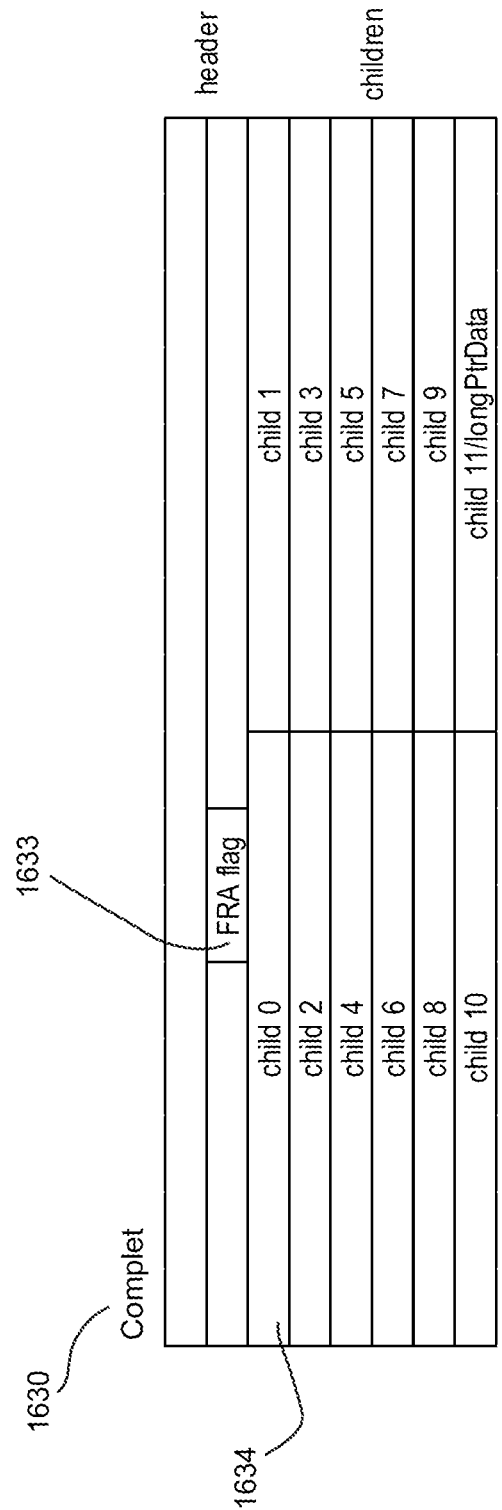

At operation 404, the traversal coprocessor 738 accesses the acceleration structure using the acceleration structure information included in the received ray query. The acceleration structure may have one or more nodes with configurations that can be used for per-node static modification of tree traversal behavior as it pertains to the test for the programmable ray operation. For example, one or more nodes of the acceleration structure is configured with a FRA flag indicating, when the FRA flag is set, that the programmable ray operation should not be applied at a particular node The acceleration structure shown in FIG. 3 may be an acceleration structure, or portion thereof, traversed according to process 400. As described above, in the acceleration structure of FIG. 3, at least the node 314 includes an FRA flag that is set (e.g. value of 1). In the same FIG. 3, node 312 is shown with the FRA corresponding to not being set (e.g. value of 0). Example node data structures each having a FRA flag and ray operation parameters are shown in FIGS. 16A and 16B.

At operation 406, the acceleration structure is traversed with the ray specified in the received ray query. During the traversal, a node which includes the FRA flag is encountered. In some embodiments, all nodes in the acceleration structure include the FRA flag indicating whether the programmable ray operation test is applicable, while in some other embodiments only certain nodes (e.g., predetermined one or more types of nodes and/or a flag indicating validity of an FRA flag in a node) include the FRA flag. For example, the acceleration structure 300 may include a valid FRA flag in every node in some embodiments, or, in some other embodiments, may have valid FRA flags only in the root nodes of the BLAS structures. FIG. 3 shows the FLA flag being configured in instance nodes 312 and 314 which are the roots of example BLAS structures 306 and 308 respectively.

At operation 406, if the encountered node has a valid FRA flag with a value of 0 indicating that the FRA flag is not set, the programmable ray operation test according to the opcode (and optional ray parameters) specified in the ray and one or more values that are specified in the node is performed at the encountered node. Example programmable ray operations, referred to below as "RayOp", are described in relation to FIGS. 15B and 17. According to some embodiments, when the node has an FRA flag set to 0, then the ray's programmable ray operation is performed for each of that node's child nodes.

If, on the other hand, the FRA flag in the encountered node has a value of 1 indicating that the FRA flag is set, then the programmable ray operation specified in the opcode is not performed at the node for any of its child nodes thus ignoring the ray operation for the encountered node. The capability of ignoring the programmable ray operation only for some nodes, as introduced by the FRA flag, enables the utilization of the powerful programmable ray operations with a wide variety of scenes and scene models without incurring the memory bloat that was described above in relation to FIG. 3B.

If at operation 406, either based on the FRA flag only or based on the combination of the FRA flag and the programmable ray operation, it is determined that the node's child nodes are to be traversed, then at operation 408, process 400 continues the traversal of the subtree(s) rooted at the node and subsequently returns whether or not the ray intersected objects in the scene.

It should be noted that whereas the FRA flag determines whether or not a programmable ray operation, such as a ray operation defined at least in part by an opcode included in the ray, is performed at a node, the FRA flag may not have any impact on other operations performed on the node such as, for example, transforming the ray from one coordinate space to another as specified in the node (e.g. as specified in instance nodes), instance masking that is independent of the programmable ray operation, etc. Non-limiting examples of traversal behavior that are modified by using the FRA flag in an encountered node to control whether or not a ray's programmable ray operation is performed at the encountered node may include culling behavior, dynamic selection of nodes to traverse based on ray characteristics, selection of which of the child nodes of the encountered are traversed, order in which child nodes of the encountered node are traversed, returning partial or intermediate traversal results from the hardware coprocessor to the processor, etc.

FIG. 5A illustrates a process 500 for performing step 406, according to some embodiments. Process 500 may be invoked when, in process 400, the traversal enters a node.

At step 502 it is determined whether the FRA flag is set in the node. In this embodiment, the FRA flag may be a binary flag with value 1 indicating that the flag is set, and value 0 indicating that the flag is not set. It will be understood that alternative embodiments may represent the set flag with 0 and with 1 otherwise.

If the FRA flag is set at the node, it is an indication that the programmable ray operation should not apply at that node. Therefore, if at step 502, it is determined that the FRA flag is set, process 500 proceeds to continue traversal at step 508.

If it is determined that the FRA flag is not set at the node, then it is an indication that the programmable ray operation is not overridden for the node, and at step 504, the programmable ray operation is performed. As noted above, the programmable ray operation is described below in relation to FIG. 17.

At step 506, in accordance with a result of the programmable ray operation performed at step 504, the culling of a node/subtree may be performed. The result of the ray operation may be an action other than culling, such as, for example, determining a particular ordering in which a set of child nodes of the node are to be traversed.

At step 508, the traversal continues in accordance with the action taken at step 506 or in accordance with the decision made at step 502 to entirely skip or ignore the programmable ray operation with respect to this node.

FIG. 5B illustrates another process 500' which may be used in performing step 406, according to another embodiment. Process 500' may be performed, when the FRA flag is more than a binary flag, and in particular, when the FRA flag is two or more bits wide and encodes two or more different actions that can be performed.

The processing steps of process 500' may be similar to those of process 500 described above, with the exception that the FRA flag is, instead of being a binary flag, is multi-bit, and is configured to specify a different action for each of two or more respective values of the flag. For example, with a FRA flag that is two bits wide, a value of 0 may be defined as "do not ignore programmable ray operation" (i.e. proceed to perform the programmable ray operation specified by the ray); a value of 1 may be defined as "ignore ray operation—proceed to traversal" (i.e. do not perform the programmable ray operation), and the values 2 and 3 may be defined for performing a predetermined first operation and a predetermined second operation respectively, where the predetermined first and second operations may be any operation such as, for example, selecting a child node according to a predetermined criteria (e.g. LOD, first occurring child node according to a predetermined ordering, value of one or more fields in a child node, etc.) for culling or traversal.

Thus, when at step 502, it is determined that the flag is set, at step 505, the action corresponding to the value of the FRA flag is performed. After step 505, the processing proceeds to continuing traversal at step 508. The processing logic of steps 502, 504, 506 and 508 may be identical in processes 500 and 500'.

Figure 12A:
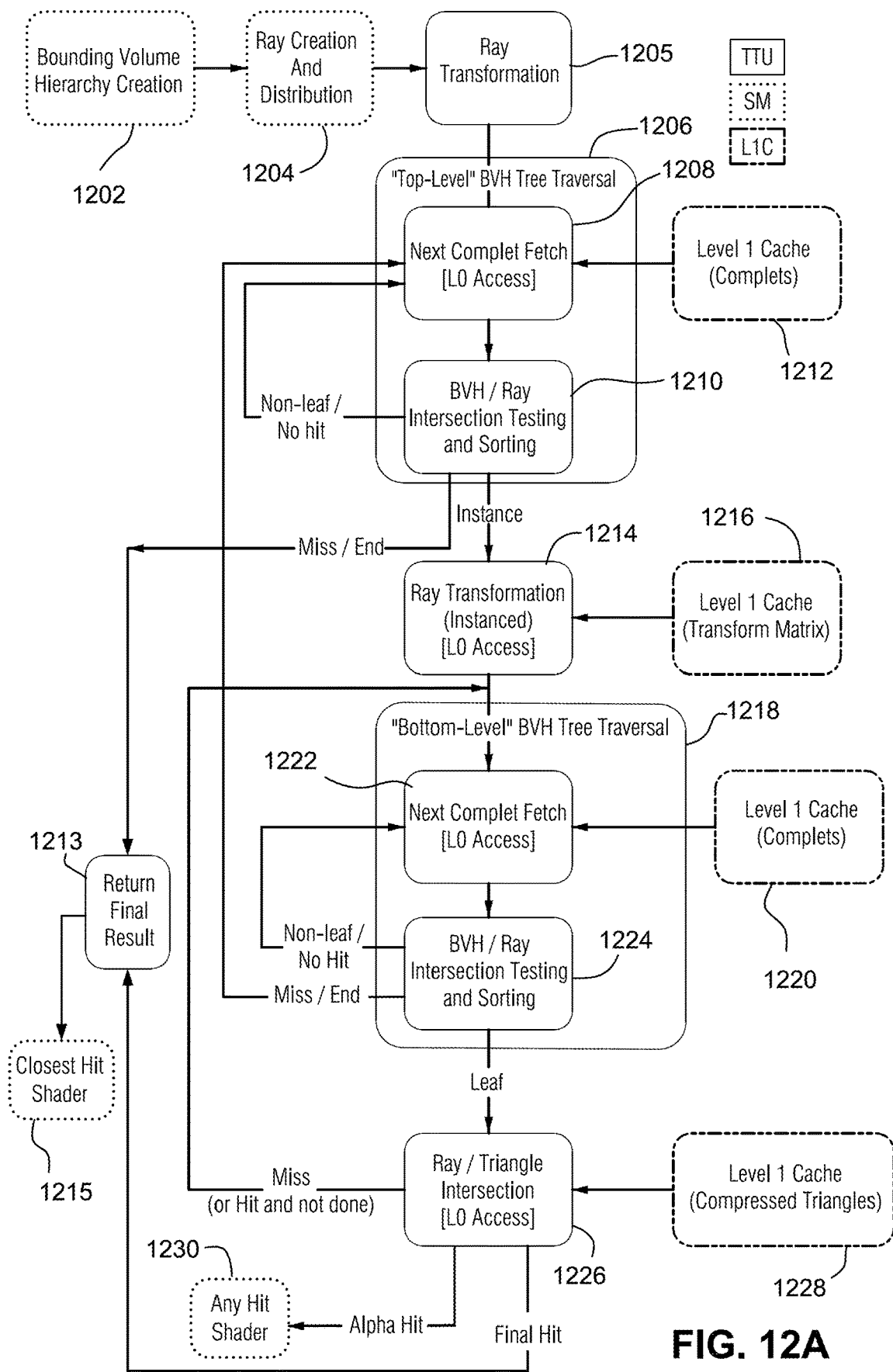
FIGS. 12A and 12B illustrate more detailed ray tracing pipelines, according to some embodiments.
Figure 12B:
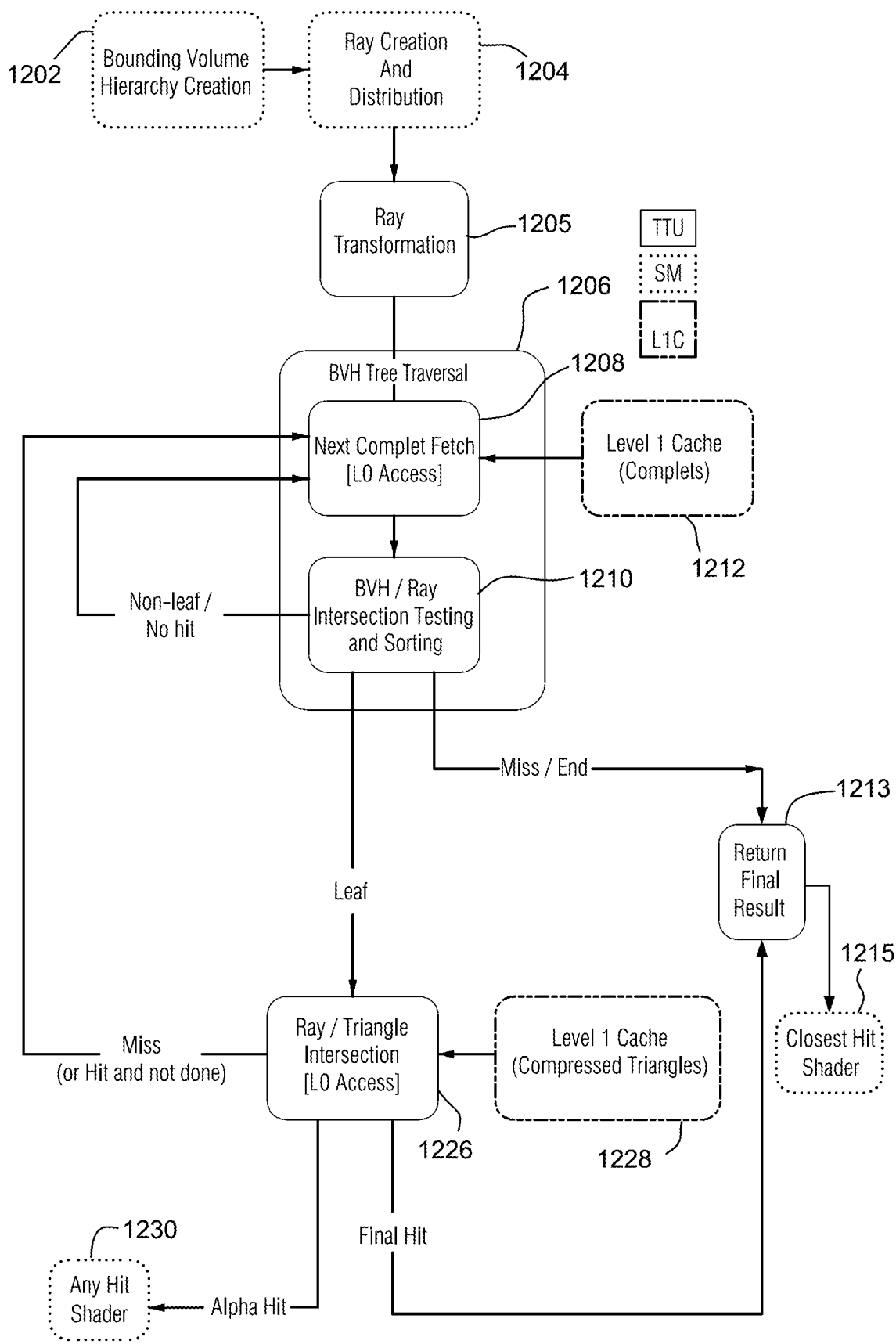

Further description of traversal of the accelerated data structure, performed on the traversal coprocessor, based on the ray information and acceleration structure information provided at step 402 is described in relation to FIGS. 12A-B. The ray intersection information returned from the traversal coprocessor is used for rendering the scene. The rendering of the scene using the intersection information is described below (e.g. step 1858) in relation to the example process of generating an image shown in FIG. 18.

The descriptions of the process for the per-node static programmable ray operation in relation to FIGS. 3, 4, 5A-5B and also the description in relation to FIG. 17 below, are examples. However, embodiments are not limited to programmable ray operations that select geometric LOD.

Building A Bounding Volume Hierarchy

As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on streaming multiprocessors (SMs) (e.g. SM 732) and/or CPU (e.g. CPU 120) and/or other development systems e.g., during development of an application.

The first stage in BVH acceleration structure construction acquires the bounding boxes of the referenced geometry. This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting approaches herein can also be applied to more expensive bounding constructs such as OBBs, bounding spheres and other bounding volume technology.

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process for example non-limiting embodiments herein performs an optimization at this stage to spot, using heuristic or other analytical techniques (which might include artificial intelligence and/or neural networks in some embodiments), those leaf nodes that present poor fits with respect to the geometry they contain.

This process continues until all bounding volumes containing geometry have been sufficiently subdivided to provide a reasonable number of geometric primitives per bounding box. The real time ray tracer that uses the BVH will determining ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets ("complets") is written out into a data structure in memory for later use by the graphics processing hardware/software during e.g., real time graphics processing that includes real time ray tracing.

Figure 6A:
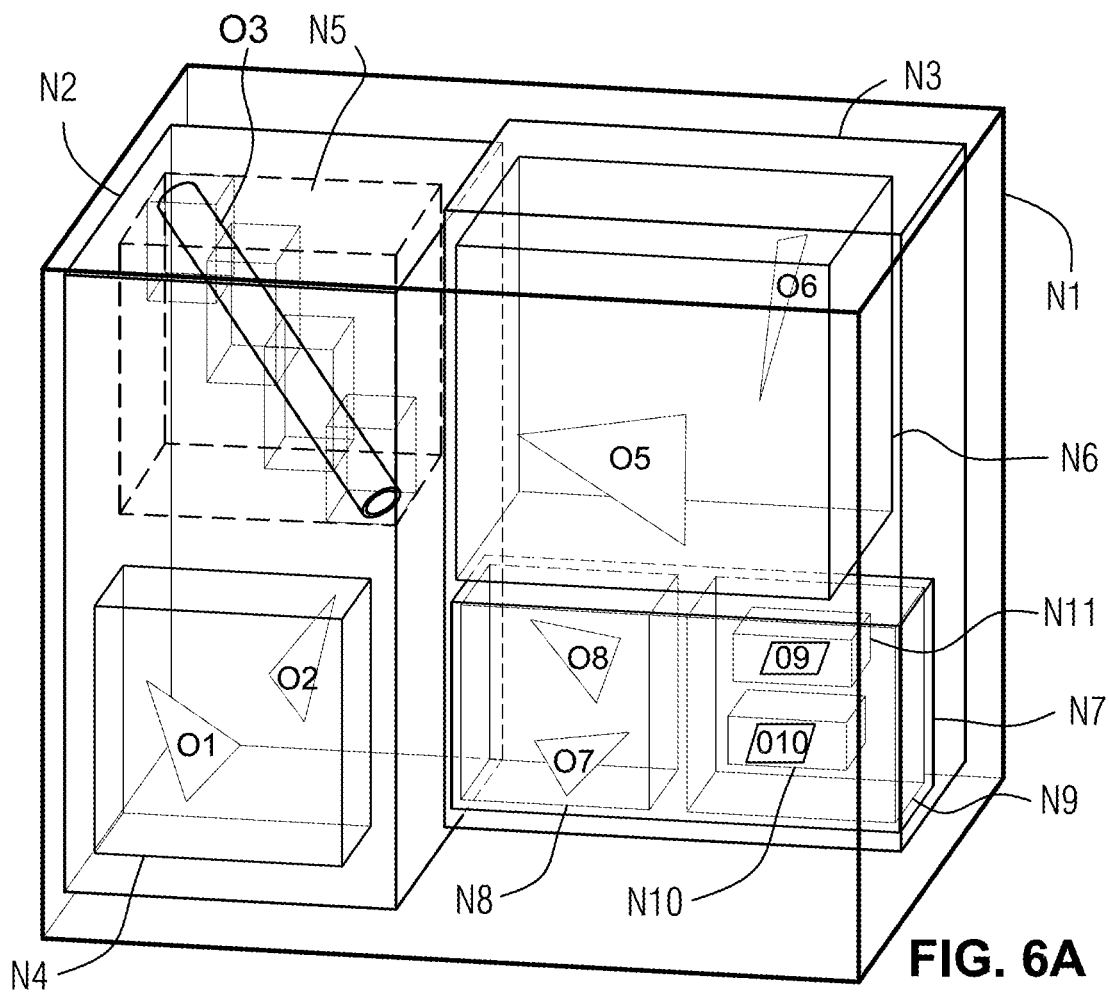
FIGS. 6A and 6B show example bounding volume hierarchy representations, according to some embodiments.
Figure 6B:
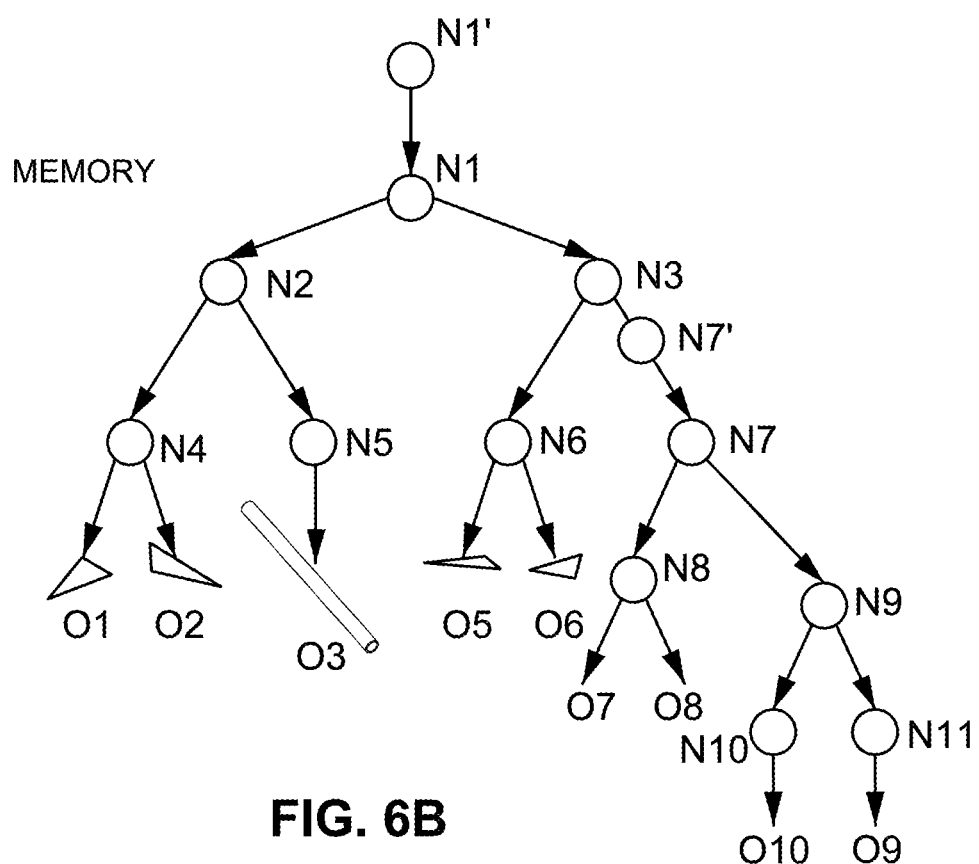

FIGS. 6A and 6B show a recursively-subdivided bounding volume of a 3D scene (FIG. 6A) and a corresponding tree data structure (FIG. 6B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 6A, bounding volume N1 is subdivided into bounding volumes N2 and N3. Children nodes N2 and N3 of the tree structure of FIG. 6B correspond to and represent the bounding volumes N2 and N3 shown in FIG. 6A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 6B tree structure correspond to and represent the FIG. 6A bounding volumes N4, N5, N6, N8, N10 and N11 in space.

The FIG. 6B tree in this particular example is only three to six levels deep so that volumes N4, N5, N6, N8, N10 and N11 constitute "leaf nodes"—that is, nodes in the tree that have no child nodes. FIG. 6A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 6A further shows that leaf node bounding volume N5 contains a single cylinder O3 such as shown in that does not provide a good fit for the AABB bounding volume N5 shown in dotted lines. Accordingly, in an example non-limiting embodiment herein, instead of using the larger AABB bounding volume N5 for the ray-bounding volume intersection test, TTU 738 instead tests the ray against a plurality of smaller AABB bounding volumes that are arranged, positioned, dimensioned and oriented to more closely fit cylinder O3.

The tree structure shown in FIG. 6B represents these leaf nodes N4, N5, N6, and N7 by associating them with the appropriate ones of primitive O1-O8 of the scene geometry. To access this scene geometry, the TTU 738 traverses the tree data structure of FIG. 6B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space, world coordinate space) to the coordinate space of N7 etc. (e.g., object space, object coordinate space).

In some embodiments, the tree or subtree rooted at N1 is associated with a parent node N1' that is an instance node. Instance node N1' may contain, or may be associated with a transform for transforming a ray from a one coordinate space to another coordinate space. In some embodiments, N1' may specify a transform from the world space to an alternative world space and may be referred to as a "top level instance node" such as that described in above mentioned application U.S. Ser. No. 16/897,745.

In more detail, see https://developer.nvidia.com/rtx/ray-tracing/dxr/DX12-Raytracing-tutorial-Part-1 which describes top (TLAS) and bottom (BLAS) levels of an acceleration data structure and ways to create a BVH using them. In one example implementation herein, for each object or set of objects, a BLAS bounding volume may be defined around the object(s)—and in the case of moving geometry, multiple bounding volumes may be defined for different time instants. That bounding volume(s) is in object space and can closely fit the object(s). The resulting BLAS contains the full definition of the geometry, organized in a way suitable for efficiently finding ray intersections with that geometry.

The BLAS is defined in object space. When creating a BVH, all of those individual objects (each of which are in their own respective object spaces) and associated subtree-lets are placed into world space using transforms. The BVH thus specifies, for each BLAS subtree, transforms from object space to world space. Shaders use those transforms to translate/rotate/scale each object into the 3D scene in world space.

The BVH meanwhile defines the TLAS bounding volumes in world space. The TLAS can be thought of as an acceleration data structure above an acceleration data structure. The top TLAS level thus enables bounding volumes and ray-complet tests, and in one embodiment needs no transforms because the ray is specified in world space. However, in the example non-limiting embodiment herein, the TLAS bounding volumes for objects under motion may also be temporally-encoded with multiple spatial positions to allow hardware circuitry to calculate a particular spatial position at the instant of a ray for purposes of ray-bounding volume intersection testing.

As the ray tracing system traverses downward to a certain point in the tree and encounters an instance node, the mode switches from TLAS (in world space) to BLAS (in object space). The object vertices are in one embodiment defined in object space as are the BLAS bounding volumes (which can be different from the TLAS bounding volumes). The transform information in the complet is used to transform the ray from world space into object space to test against the BLAS subtree. In one embodiment, the same interpolation hardware used for TLAS ray-bounding volume intersection testing can also be used for BLAS ray-bounding volume intersection testing—and different (e.g., higher precision) hardware may be provided for vertex interpolation and ray-primitive intersection testing on the BLAS level.

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs")—subunits of one or a group of streaming multiprocessor SMs of a 3D graphics processing pipeline. The following describes the overall structure and operation of such as system including a TTU 738 that accelerates certain processes supporting interactive ray tracing including ray-bounding volume intersection tests, ray-primitive intersection tests and ray "instance" transforms for real time ray tracing and other applications.

Example System Block Diagram

Figure 7:
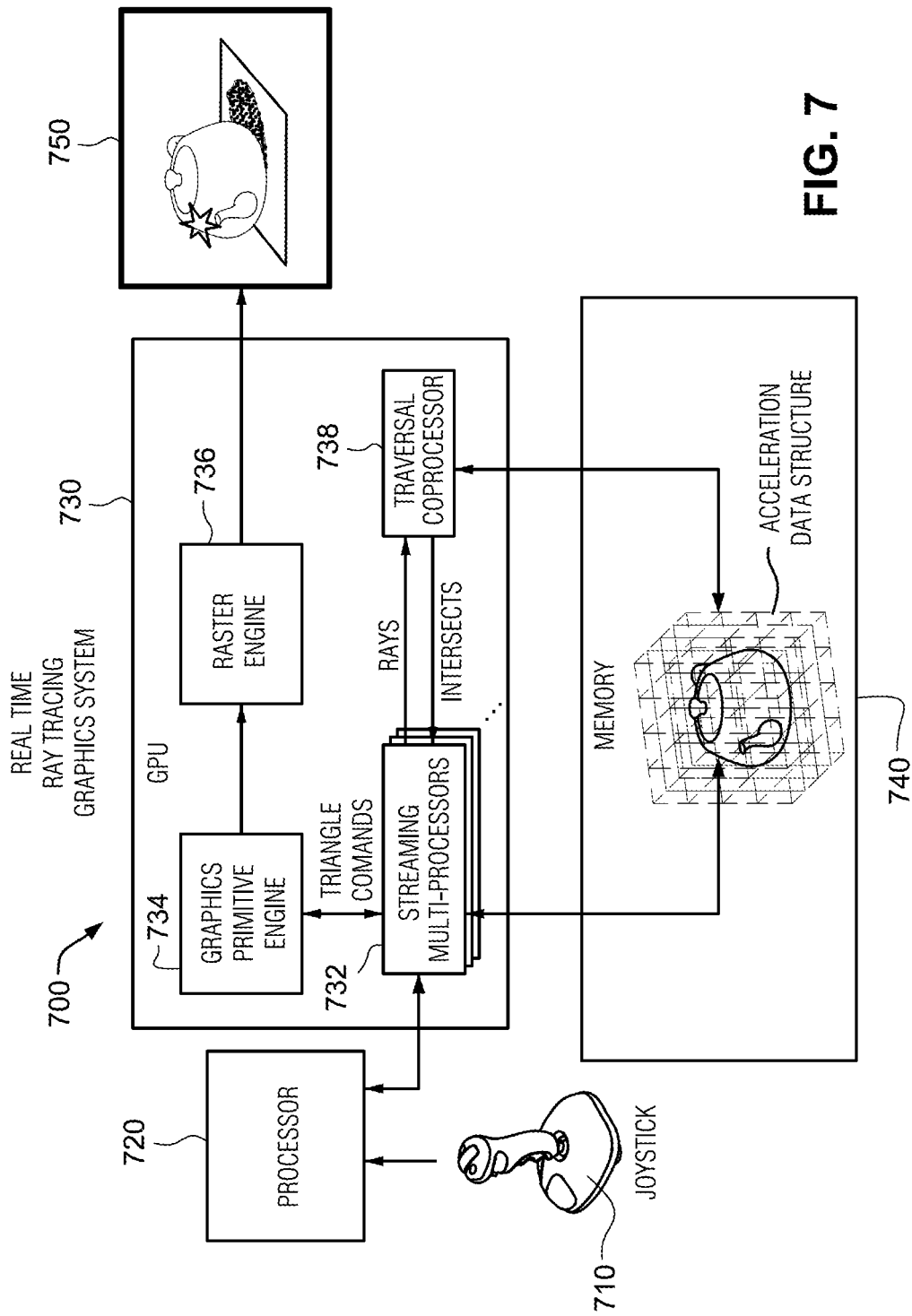
FIG. 7 illustrates an example non-limiting ray tracing graphics system according to some embodiments.

FIG. 7 illustrates an example real time ray interactive tracing graphics system 700 for generating images using three dimensional (3D) data of a scene or object(s) including the acceleration data structure constructed as described above.

System 700 includes an input device 710, a processor(s) 720, a graphics processing unit(s) (GPU(s)) 730, memory 740, and a display(s) 750. The system shown in FIG. 7 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 720 may be a multicore central processing unit (CPU) operable to execute an application in real time interactive response to input device 710, the output of which includes images for display on display 750. Display 750 may be any kind of display such as a stationary display, a head mounted display such as display glasses or goggles, other types of wearable displays, a handheld display, a vehicle mounted display, etc. For example, the processor 720 may execute an application based on inputs received from the input device 710 (e.g., a joystick, an inertial sensor, an ambient light sensor, etc.) and instruct the GPU 730 to generate images showing application progress for display on the display 750.

Based on execution of the application on processor 720, the processor may issue instructions for the GPU 730 to generate images using 3D data stored in memory 740. The GPU 730 includes specialized hardware for accelerating the generation of images in real time. For example, the GPU 730 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 720, which may have multiple cores with lots of cache memory that can handle a few software threads at a time, the GPU 730 may include hundreds or thousands of processing cores or "streaming multiprocessors" (SMs) 732 running in parallel.

In one example embodiment, the GPU 730 includes a plurality of programmable high performance processors that can be referred to as "streaming multiprocessors" ("SMs") 732, and a hardware-based graphics pipeline including a graphics primitive engine 734 and a raster engine 736. These components of the GPU 730 are configured to perform real-time image rendering using a technique called "scan conversion rasterization" to display three-dimensional scenes on a two-dimensional display 750. In rasterization, geometric building blocks (e.g., points, lines, triangles, quads, meshes, etc.) of a 3D scene are mapped to pixels of the display (often via a frame buffer memory).

The GPU 730 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 750 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 750.

To enable the GPU 730 to perform ray tracing in real time in an efficient manner, the GPU provides one or more "TTUs" 738 coupled to one or more SMs 732. The TTU 738 includes hardware components configured to perform (or accelerate) operations commonly utilized in ray tracing algorithms A goal of the TTU 738 is to accelerate operations used in ray tracing to such an extent that it brings the power of ray tracing to real-time graphics application (e.g., games), enabling high-quality shadows, reflections, and global illumination. Results produced by the TTU 738 may be used together with or as an alternative to other graphics related operations performed in the GPU 730.

More specifically, SMs 732 and the TTU 738 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 732 working with TTU 738 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 738 is capable of accelerating in hardware certain of the more computationally-intensive aspects of that process.

Given a BVH constructed as described above, the TTU 738 performs a tree search where each node in the tree visited by the ray has a bounding volume for each descendent branch or leaf, and the ray only visits the descendent branches or leaves whose corresponding bound volume it intersects. In this way, TTU 738 explicitly tests only a small number of primitives for intersection, namely those that reside in leaf nodes intersected by the ray. In the example non-limiting embodiments, the TTU 738 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 738 does all of this in MIMD fashion, meaning that rays are handled independently once inside the TTU.

In the example non-limiting embodiments, the TTU 738 operates as a servant (coprocessor) to the SMs (streaming multiprocessors) 732. In other words, the TTU 738 in example non-limiting embodiments does not operate independently, but instead follows the commands of the SMs 732 to perform certain computationally-intensive ray tracing related tasks much more efficiently than the SMs 732 could perform themselves. In other embodiments or architectures, the TTU 138 could have more or less autonomy.

In the examples shown, the TTU 738 receives commands via SM 732 instructions and writes results back to an SM register file. For many use cases (e.g., opaque triangles with at most two level of instancing), the TTU 738 can service the ray tracing query without further interaction with the SM 732. More complicated queries (e.g., involving alpha-tested triangles, primitives other than triangles, or more than two levels of instancing) may require multiple round trips (although the technology herein reduces the need for such "round trips" for certain kinds of geometry by providing the TTU 738 with enhanced capabilities to autonomously perform ray-bounding-volume intersection testing without the need to ask the calling SM for help). In addition to tracing rays, the TTU 738 is capable of performing more general spatial queries where an AABB or the extruded volume between two AABBs (which we call a "beam") takes the place of the ray. Thus, while the TTU 738 is especially adapted to accelerate ray tracing related tasks, it can also be used to perform tasks other than ray tracing.

The TTU 738 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 738 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As mentioned above, the TTU 138 also accelerates the transform of each ray from world space into object space to obtain finer and finer bounding box encapsulations of the primitives and reduce the duplication of those primitives across the scene. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Example Ray Tracing Processes

Figure 8:
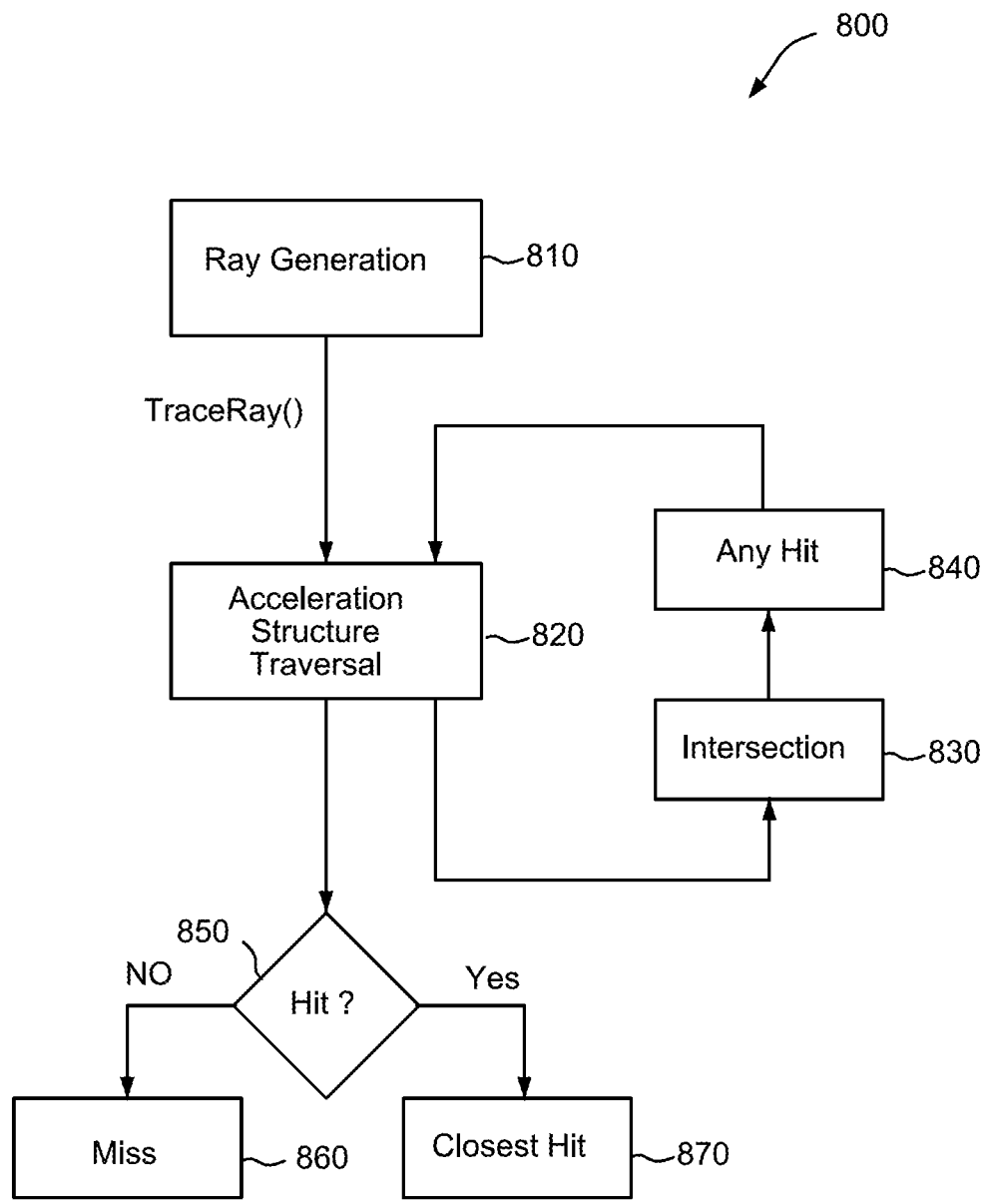
FIG. 8 is a flowchart of an example non-limiting ray tracing graphics pipeline according to some embodiments.

FIG. 8 shows an exemplary ray tracing shading pipeline 800 that may be performed by SM 732 and accelerated by TTU 738. The ray tracing shading pipeline 800 starts by an SM 732 invoking ray generation 810 and issuing a corresponding ray tracing request to the TTU 738. The ray tracing request identifies a single ray cast into the scene and asks the TTU 738 to search for intersections with an acceleration data structure the SM 732 also specifies. The TTU 738 traverses (FIG. 8 block 820) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 738 ray-primitive test block 1020 performs an intersection 830 process to determine whether the ray intersects the primitives. The TTU 738 returns intersection information to the SM 732, which may perform an "any hit" shading operation 840 in response to the intersection determination. For example, the SM 732 may perform (or have other hardware perform) a texture lookup for an intersected primitive and decide based on the appropriate texel's value how to shade a pixel visualizing the ray. The SM 732 keeps track of such results since the TTU 738 may return multiple intersections with different geometry in the scene in arbitrary order.

Figure 9:
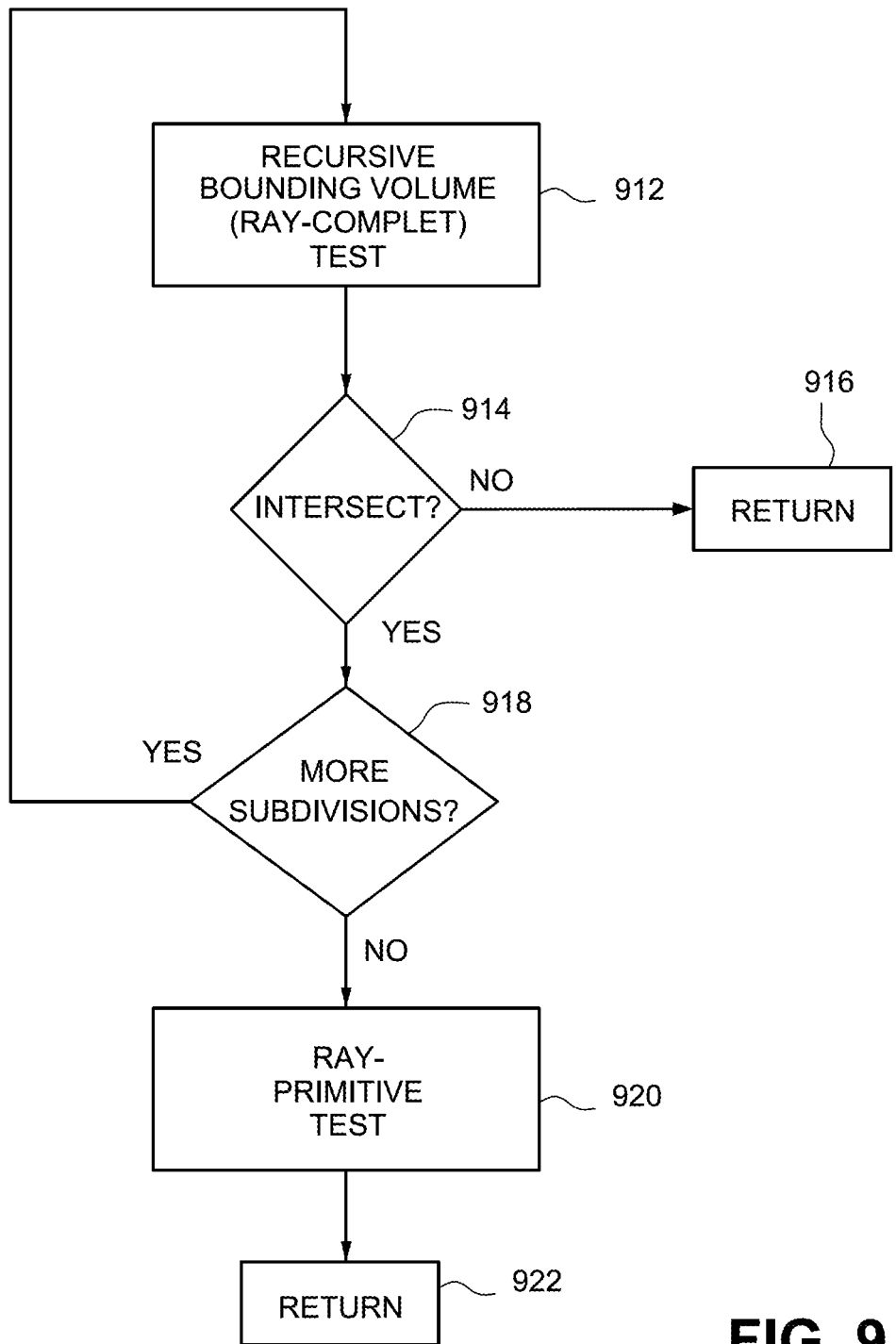
FIG. 9 is a flowchart of example non-limiting hardware based ray tracing operations, according to some embodiments.
Figure 10:
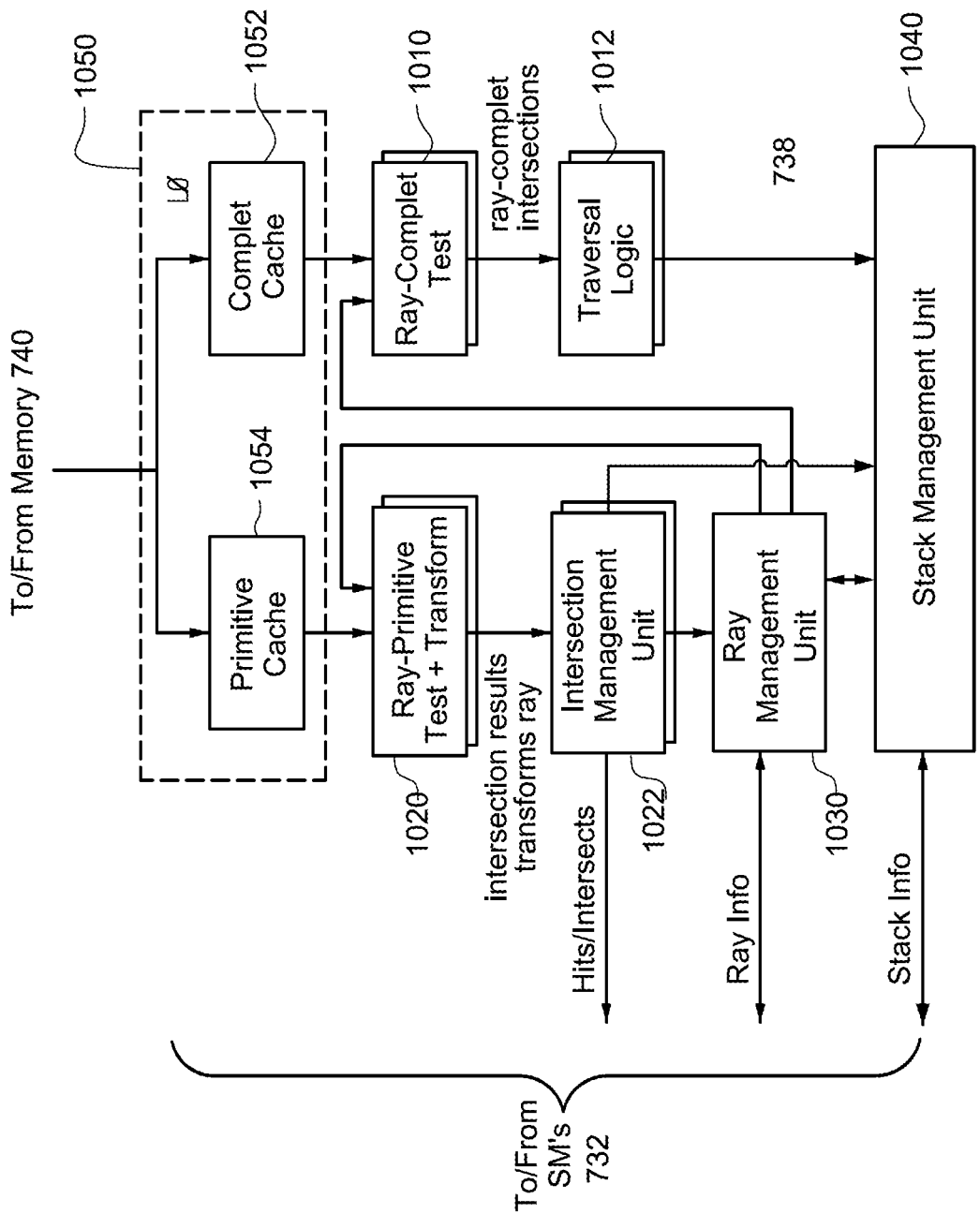
FIG. 10 shows a simplified example non-limiting traversal co-processor comprising a tree traversal unit (TTU), according to some embodiments.
Figure 11:
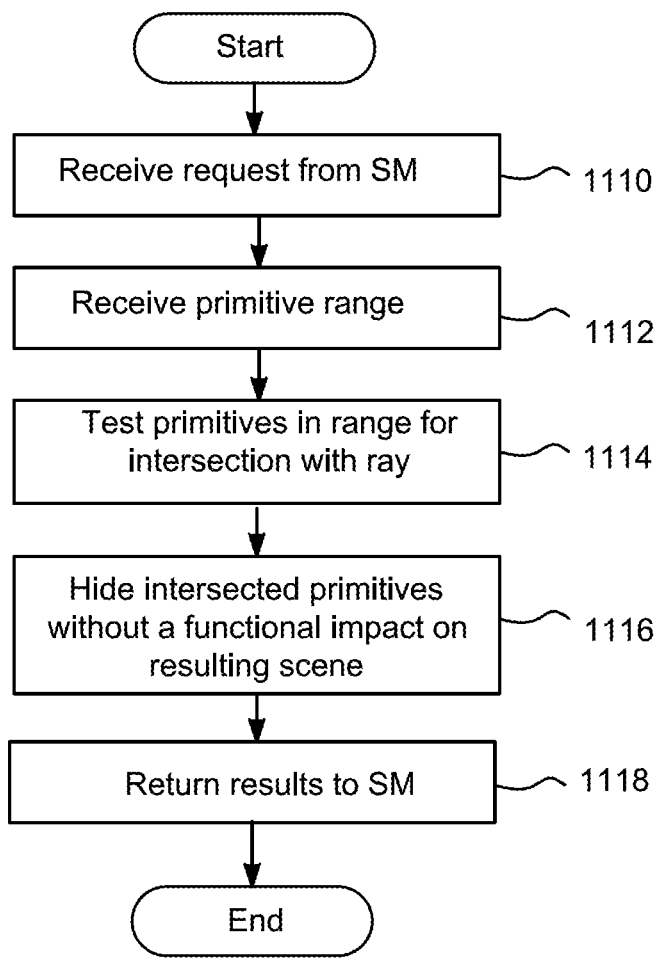
FIG. 11 is a flowcharts of example TTU processing, according to some embodiments.

FIG. 9 is a flowchart summarizing example ray tracing operations the TTU 738 performs as described above in cooperation with SM(s) 732. The FIG. 9 operations are performed by TTU 738 in cooperation with its interaction with an SM 732. The TTU 738 may thus receive the identification of a ray from the SM 732 and traversal state enumerating one or more nodes in one or more BVH's that the ray must traverse. The TTU 738 determines which bounding volumes of a BVH data structure the ray intersects (the "ray-complet" test 912). The TTU 738 can also subsequently determine whether the ray intersects one or more primitives in the intersected bounding volumes and which triangles are intersected (the "ray-primitive test" 920)—or the SM 732 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

First, the TTU 738 inspects the traversal state of the ray. If a stack the TTU 738 maintains for the ray is empty, then traversal is complete. If there is an entry on the top of the stack, the traversal co-processor 738 issues a request to the memory subsystem to retrieve that node. The traversal co-processor 738 then performs a bounding box test 912 to determine if a bounding volume of a BVH data structure is intersected by a particular ray the SM 732 specifies (step 912, 914). If the bounding box test determines that the bounding volume is not intersected by the ray ("No" in step 914), then there is no need to perform any further testing for visualization and the TTU 738 can return this result to the requesting SM 732. This is because if a ray misses a bounding volume (as in FIG. 1A with respect to bounding volume 110), then the ray will miss all other smaller bounding volumes inside the bounding volume being tested and any primitives that bounding volume contains.

If the bounding box test performed by the TTU 738 reveals that the bounding volume is intersected by the ray ("Yes" in Step 914), then the TTU determines if the bounding volume can be subdivided into smaller bounding volumes (step 918). In one example embodiment, the TTU 738 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 738, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 738 pushes nodes whose bounding volumes are hit by a ray onto the ray's traversal stack (e.g. traversal stack 1302 in FIG. 13) in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 918), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 914 while other bounding volumes may result in still further and further subdivisions being tested for intersection by TTU 738 recursively applying steps 912-918.

Once the TTU 738 determines that the bounding volumes intersected by the ray are leaf nodes ("No" in step 918), the TTU 738 and/or SM 732 performs a primitive (e.g., triangle) intersection test 920 to determine whether the ray intersects primitives in the intersected bounding volumes and which primitives the ray intersects. The TTU 738 thus performs a depth-first traversal of intersected descendent branch nodes until leaf nodes are reached. The TTU 738 processes the leaf nodes. If the leaf nodes are primitive ranges, the TTU 738 or the SM 732 tests them against the ray. If the leaf nodes are instance nodes, the TTU 738 or the SM 732 applies the instance transform. If the leaf nodes are item ranges, the TTU 738 returns them to the requesting SM 732. In the example non-limiting embodiments, the SM 732 can command the TTU 738 to perform different kinds of ray-primitive intersection tests and report different results depending on the operations coming from an application (or an software stack the application is running on) and relayed by the SM to the TTU. For example, the SM 732 can command the TTU 738 to report the nearest visible primitive revealed by the intersection test, or to report all primitives the ray intersects irrespective of whether they are the nearest visible primitive. The SM 732 can use these different results for different kinds of visualization. Or the SM 732 can perform the ray-primitive intersection test itself once the TTU 738 has reported the ray-complet test results. Once the TTU 738 is done processing the leaf nodes, there may be other branch nodes (pushed earlier onto the ray's stack) to test.

Example Non-Limiting TTU 738 Hardware Implementation

FIG. 10 shows an example simplified block diagram of TTU 738 including hardware configured to perform accelerated traversal operations as described above. In some embodiments, the TTU 738 may perform a depth-first traversal of a bounding volume hierarchy using a short stack traversal with intersection testing of supported leaf node primitives and mid-traversal return of alpha primitives and unsupported leaf node primitives (items). The TTU 738 includes dedicated hardware to determine whether a ray intersects bounding volumes and dedicated hardware to determine whether a ray intersects primitives of the tree data structure.

In more detail, TTU 738 includes an intersection management block 1022, a ray management block 1030 and a stack management block 1040. Each of these blocks (and all of the other blocks in FIG. 10) may constitute dedicated hardware implemented by logic gates, registers, hardware-embedded lookup tables or other combinatorial logic, etc.

The ray management block 1030 is responsible for managing information about and performing operations concerning a ray specified by an SM 732 to the ray management block. The stack management block 1040 works in conjunction with traversal logic 1012 to manage information about and perform operations related to traversal of a BVH acceleration data structure. Traversal logic 1012 is directed by results of a ray-complet test block 1010 that tests intersections between the ray indicated by the ray management block 1030 and volumetric subdivisions represented by the BVH, using instance transforms as needed. The ray-complet test block 1010 retrieves additional information concerning the BVH from memory 740 via an L0 complet cache 1052 that is part of the TTU 738. The results of the ray-complet test block 1010 informs the traversal logic 1012 as to whether further recursive traversals are needed. The stack management block 740 maintains stacks to keep track of state information as the traversal logic 1012 traverses from one level of the BVH to another, with the stack management block 1040 pushing items onto the stack as the traversal logic traverses deeper into the BVH and popping items from the stack as the traversal logic traverses upwards in the BVH. The stack management block 1040 is able to provide state information (e.g., intermediate or final results) to the requesting SM 732 at any time the SM requests.

The intersection management block 1022 manages information about and performs operations concerning intersections between rays and primitives, using instance transforms as needed. The ray-primitive test block 1020 retrieves information concerning geometry from memory 140 on an as-needed basis via an L0 primitive cache 1054 that is part of TTU 138. The intersection management block 1022 is informed by results of intersection tests the ray-primitive test and transform block 1020 performs. Thus, the ray-primitive test and transform block 1-20 provides intersection results to the intersection management block 1022, which reports geometry hits and intersections to the requesting SM 732.

A Stack Management Unit 1040 inspects the traversal state to determine what type of data needs to be retrieved and which data path (complet or primitive) will consume it. The intersections for the bounding volumes are determined in the ray-complet test path of the TTU 738 including one or more ray-complet test blocks 1010 and one or more traversal logic blocks 1012. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 738 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 1020 and one or more intersection management blocks 1022.

The TTU 738 receives queries from one or more SMs 732 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 1030. The stored ray information (e.g., ray length) may be updated based on the results of the ray-primitive test.

The TTU 738 may request the BVH data structure identified in the query to be retrieved from memory outside of the TTU 738. Retrieved portions of the BVH data structure may be cached in the level-zero (L0) cache 1050 within the TTU 738 so the information is available for other time-coherent TTU operations, thereby reducing memory 1040 accesses. Portions of the BVH data structure needed for the ray-complet test may be stored in a L0 complet cache 1052 and portions of the BVH data structure needed for the ray-primitive test may be stored in an L0 primitive cache 1054.

After the complet information needed for a requested traversal step is available in the complet cache 1052, the ray-complet test block 1010 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 738 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 1012 to traverse down to the next level of the BVH). These steps are repeated recursively until intersected leaf nodes of the BVH are encountered The ray-complet test block 1010 may provide ray-complet intersections to the traversal logic 1012. Using the results of the ray-complet test, the traversal logic 1012 creates stack entries to be pushed to the stack management block 1040. The stack entries may indicate internal nodes (i.e., a node that includes one or more child nodes) that need to be further tested for ray intersections by the ray-complet test block 1010 and/or triangles identified in an intersected leaf node that need to be tested for ray intersections by the ray-primitive test and transform block 1020. The ray-complet test block 1010 may repeat the traversal on internal nodes identified in the stack to determine all leaf nodes in the BVH that the ray intersects. The precise tests the ray-complet test block 1010 performs will in the example non-limiting embodiment be determined by mode bits, ray operations (see below) and culling of hits, and the TTU 738 may return intermediate as well as final results to the SM 732.

Ray-Primitive Intersection Testing

Referring again to FIG. 11, the TTU 738 also has the ability to accelerate intersection tests that determine whether a ray intersects particular geometry or primitives. For some cases, the geometry is sufficiently complex (e.g., defined by curves or other abstract constructs as opposed to e.g., vertices) that TTU 738 in some embodiments may not be able to help with the ray-primitive intersection testing. In such cases, the TTU 738 simply reports the ray-complet intersection test results to the SM 732, and the SM 732 performs the ray-primitive intersection test itself. In other cases (e.g., triangles), the TTU 732 can perform the ray-triangle intersection test itself, thereby further increasing performance of the overall ray tracing process. For sake of completeness, the following describes how the TTU 738 can perform or accelerate the ray-primitive intersection testing.

As explained above, leaf nodes found to be intersected by the ray identify (enclose) primitives that may or may not be intersected by the ray. One option is for the TTU 738 to provide e.g., a range of geometry identified in the intersected leaf nodes to the SM 732 for further processing. For example, the SM 732 may itself determine whether the identified primitives are intersected by the ray based on the information the TTU 738 provides as a result of the TTU traversing the BVH. To offload this processing from the SM 732 and thereby accelerate it using the hardware of the TTU 738, the stack management block 1040 may issue requests for the ray-primitive and transform block 1020 to perform a ray-primitive test for the primitives within intersected leaf nodes the TTU's ray-complet test block 1010 identified. In some embodiments, the SM 732 may issue a request for the ray-primitive test to test a specific range of primitives and transform block 1020 irrespective of how that geometry range was identified.

After making sure the primitive data needed for a requested ray-primitive test is available in the primitive cache 1054, the ray-primitive and transform block 1020 may determine primitives that are intersected by the ray using the ray information stored in the ray management block 1030. The ray-primitive test block 1020 provides the identification of primitives determined to be intersected by the ray to the intersection management block 1022.

The intersection management block 1022 can return the results of the ray-primitive test to the SM 732. The results of the ray-primitive test may include identifiers of intersected primitives, the distance of intersections from the ray origin and other information concerning properties of the intersected primitives. In some embodiments, the intersection management block 1022 may modify an existing ray-primitive test (e.g., by modifying the length of the ray) based on previous intersection results from the ray-primitive and transform block 1020.

The intersection management block 1022 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 732 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 738 can push transparent hits to queues in memory for later handling by the SM 732 and directly handle trimmed triangles by sending requests to the texture unit. Each triangle may include a designator to indicate the triangle type. The intersection management block 1022 is configured to maintain a result queue for tracking the different types of intersected triangles. For example, the result queue (e.g. result queue 1410 in FIG. 14) may store one or more intersected opaque triangle identifiers in one queue 1412 and one or more transparent triangle identifiers in another queue 1414.

For opaque triangles, the ray intersection for less complex geometry can be fully determined in the TTU 738 because the area of the opaque triangle blocks the ray from going past the surface of the triangle. For transparent triangles, ray intersections cannot in some embodiments be fully determined in the TTU 738 because TTU 738 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 1020 determines are intersected may be sent to the SM 732, for the SM to make the full determination as to whether the triangle affects visibility along the ray.

The SM 732 can resolve whether or not the ray intersects a texture associated with the transparent triangle and/or whether the ray will be blocked by the texture. The SM 732 may in some cases send a modified query to the TTU 738 (e.g., shortening the ray if the ray is blocked by the texture) based on this determination. In one embodiment, the TTU 738 may be configured to return all triangles determined to intersect the ray to the SM 732 for further processing. Because returning every triangle intersection to the SM 732 for further processing is costly in terms of interface and thread synchronization, the TTU 738 may be configured to hide triangles which are intersected but are provably capable of being hidden without a functional impact on the resulting scene. For example, because the TTU 738 is provided with triangle type information (e.g., whether a triangle is opaque or transparent), the TTU 738 may use the triangle type information to determine intersected triangles that are occluded along the ray by another intersecting opaque triangle and which thus need not be included in the results because they will not affect the visibility along the ray. If the TTU 738 knows that a triangle is occluded along the ray by an opaque triangle, the occluded triangle can be hidden from the results without impact on visualization of the resulting scene.

The intersection management block 1022 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 732.

In some embodiments, once an opaque triangle intersection is identified, the intersection management block 1022 may shorten the ray stored in the ray management block 1030 so that bounding volumes (which may include triangles) behind the intersected opaque triangle (along the ray) will not be identified as intersecting the ray.

The intersection management block 1022 may store information about intersected transparent triangles in a separate queue. The stored information about intersected transparent triangles may be sent to the SM 732 for the SM to resolve whether or not the ray intersects a texture associated with the triangle and/or whether the texture blocks the ray. The SM may return the results of this determination to the TTU 738 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 738 may determine which triangles in the acceleration data structure are intersected by the ray and return the results to the SM 732. However, returning to the SM 732 a result on every triangle intersection is costly in terms of interface and thread synchronization. The TTU 738 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 738 disclosed in this application provides for some of the intersections to be discarded within the TTU 738 without SM 732 intervention so that less intersections are returned to the SM 732 and the SM 132 does not have to inspect all intersected triangles or item ranges.

Example Instancing Pipeline Implementation by TTU 738 and SM 732

The following describes how TTU 738 in example embodiments performs instancing and associated transforms.

The FIG. 12A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 12A is essentially software-defined (which in example embodiments means it is determined by the SMs 732) but makes extensive use of hardware acceleration by TTU 738. Key components include the SM 732 (and the rest of the compute pipeline), the TTU 738 (which serves as a coprocessor to SM), and the L1 cache and downstream memory system, from which the TTU fetches BVH and triangle data.

The pipeline shown in FIG. 12A shows that bounding volume hierarchy creation 1202 can be performed ahead of time by a development system. It also shows that ray creation and distribution 1204 are performed or controlled by the SM 732 or other software in the example embodiment, as shading (which can include lighting and texturing). The example pipeline includes a "top level" BVH tree traversal 1206, ray transformation 1214, "bottom level" BVH tree traversal 1218, and a ray/triangle (or other primitive) intersection 1226 that are each performed by the TTU 738. These do not have to be performed in the order shown, as handshaking between the TTU 738 and the SM 732 determines what the TTU 738 does and in what order.

The SM 732 presents one or more rays to the TTU 738 at a time. Each ray the SM 732 presents to the TTU 738 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 732 to communicate certain state information to the TTU 738 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 732 presents with each query (e.g., ray) may at least partly control how the TTU 738 will process the query when the query intersects the bounding volume of a specific type or intersects a primitive of a specific primitive type. The mode flags the SM 732 provides to the TTU 738 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 738 to control various aspects of traversal behavior, back-face culling, and handling of the various child node types, subject to a pass/fail status of an optional RayOp test. RayOp tests add flexibility to the capabilities of the TTU 738, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 12A, the TTU 738 performs a top level tree traversal 1206 and a bottom level tree traversal 1218. In the example embodiment, the two level traversal of the BVH enables fast ray tracing responses to dynamic scene changes.

In some embodiments, upon entry to top level tree traversal, or in the top level tree traversal, an optional instance node 1205 specifying a top level transform is encountered in the BVH. The instance node 1205, if it exists, indicates to the TTU that the subtree rooted at the instance node 1205 is aligned to an alternate world space coordinate system for which the transform from the world space is defined in the instance node 1205. Top level instance nodes and their use are described in U.S. application Ser. No. 16/897,745, titled "Ray Tracing Hardware Acceleration with Alternative World Space Transforms" which is herein incorporated by reference in its entirety.

The top level of the acceleration structure (TLAS) contains geometry in world space coordinates and the bottom level of the acceleration structure (BLAS) contains geometry in object space coordinates. The TTU maintains ray state and stack state separately for the TLAS traversal and the BLAS traversal because they are effectively independent traversals.

As described above the SM informs the TTU the location in the BVH for starting a ray traversal upon launching a new ray query or relaunching a ray query by including a stack initialization complet in the ray query transmitted to the TTU. The stack initialization complet includes a pointer to the root of the subtree that is to be traversed.

Ray transformation 1214 provides the appropriate transition from the top level tree traversal 1206 to the bottom level tree traversal 1218 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1206 by TTU 738 receives complets from the L1 cache 1212, and provides an instance to the ray transformation 1214 for transformation, or a miss/end output 1213 to the SM 732 for closest hit shader 1215 processing by the SM (this block can also operate recursively based on non-leaf nodes/no hit conditions). In the top level tree traversal 1206, a next complet fetch step 1208 fetches the next complet to be tested for ray intersection in step 1210 from the memory and/or cache hierarchy and ray-bounding volume intersection testing is done on the bounding volumes in the fetched complet.

As described above, an instance node connects one BVH to another BVH which is in a different coordinate system. When a child of the intersected bounding volume is an instance node, the ray transformation 1214 is able to retrieve an appropriate transform matrix from the L1 cache 1216. The TTU 738, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 738 shown in FIG. 12B, the TTU does not execute a "bottom" level tree traversal 1018 and noninstanced tree BVH traversals are performed by blocks 1208, 1210 e.g., using only one stack. The TTU 738 can switch between the FIG. 12A instanced operations and the FIG. 12B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1210 is performed on each bounding volume in the fetched complet before the next complet is fetched. Other embodiments may use other techniques, such as, for example, traversing the top level traversal BVH in a depth-first manner U.S. Pat. No. 9,582,607, already incorporated by reference, describes one or more complet structures and contents that may be used in example embodiments. U.S. Pat. No. 9,582,607 also describes an example traversal of complets.

Figure 13:
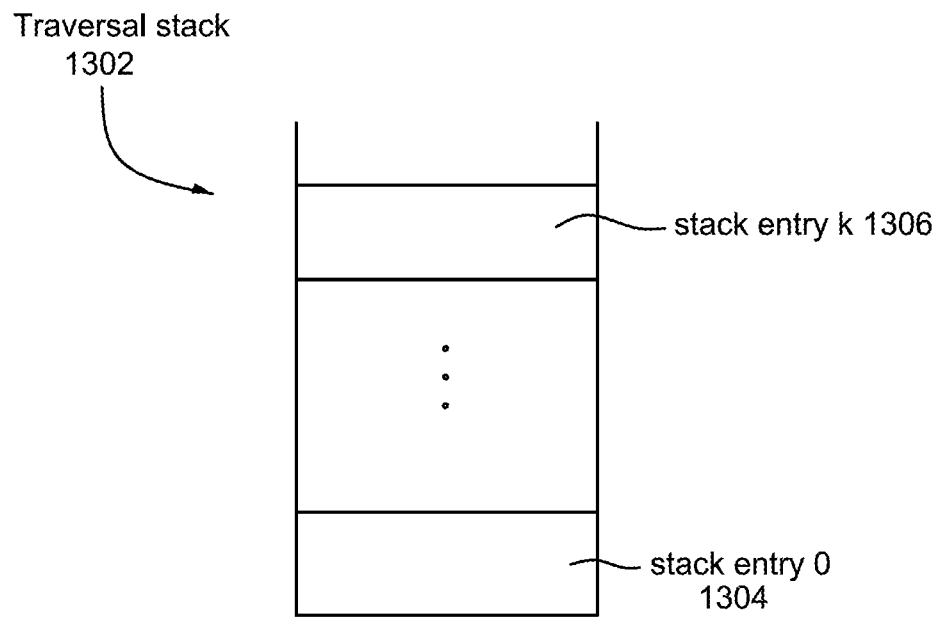
FIG. 13 shows an example traversal stack for use by the ray tracing pipeline, according to some embodiments.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1206, and primitives to be tested for intersection, and a larger local stack data structure can be used to keep track of the traversal state in the bottom level tree traversal 1218. FIG. 13 shows an example traversal stack 1302 with bottom stack entry 1304 and top stack entry 1306.

Example Bottom Level Tree Traversal

In the bottom level tree traversal 1218, a next complet fetch step 1222 fetches the next complet to be tested for ray intersection in step 1224 from the memory and/or cache hierarchy 1220 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1206 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1226.

The leaf outputs of the bottom level tree traversal 1218 are provided to the ray/triangle intersection 1226 (which has L0 cache access as well as ability to retrieve triangles via the L1 cache 1228). The L0 complet and triangle caches may be small read-only caches internal to the TTU 138. The ray/triangle intersection 1226 may also receive leaf outputs from the top level tree traversal 1206 when certain leaf nodes are reached without traversing an instanced BVH.

After all the primitives in the primitive range have been processed, the Intersection Management Unit inspects the state of the result Queue (e.g. result queue 1410 in FIG. 14) and crafts packets to send to the Stack Management Unit and/or Ray Management Unit to update the ray's attributes and traversal state, set up the ray's next traversal step, and/or return the ray to the SM 732 (if necessary). If the result queue contains opaque 1412 or alpha 1414 intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 1040 receives the packet from Intersection Management Unit 1022, the Stack Management Unit 1040 inspects the packet to determine the next action required to complete the traversal step and start the next one. If the packet from Intersection Management Unit 1022 indicates an opaque intersection has been found in the primitive range and the ray mode bits indicate the ray is to finish traversal once any intersection has been found the Stack Management Unit 1040 returns the ray and its results queue to the SM with traversal state indicating that traversal is complete (a done flag set and/or an empty top level and bottom level stack). If the packet from Intersection Management Unit 1022 indicates that there opaque or alpha intersection in the result queue and that there are remaining alpha intersections in the primitive range not present in the result queue that were encountered by the ray during the processing of the primitive range that have not already been returned to the SM, the Stack Management Unit 1040 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 1022 indicates that no opaque or alpha intersections were found when the ray processed the primitive range the Stack Management Unit 1040 pops the top of stack entry (corresponding to the finished primitive range) off the active traversal stack. If the packet from Stack Management Unit 1040 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM the Stack Management Unit 1040 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 1040 sets the active stack to the top stack. If the top stack is the active stack, and the active stack is empty, then the Stack Management Unit 1040 returns the ray and its result queue to the SM with traversal state indicating that traversal is complete (a done flag set and/or an empty top level and bottom level stack). If the active stack contains one or more stack entries, then the Stack Management Unit 1040 inspects the top stack entry and starts the next traversal step. Testing of primitive and/or primitive ranges for intersections with a ray and returning results to the SM 732 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Data Structures for Combined Ray Operation and Node Masking

During traversal of a BVH by a ray in the TTU, the traversal state for the ray is maintained in the TTU. The traversal state may include a stack of one or more entries which reference bounding volumes and/or complets in the tree structure which are to be fetched and tested against the ray. A traversal stack 1302 according to some embodiments is shown in FIG. 13. The traversal stack 1302 may include any number of stack entries. In some embodiments, the stack 1302 is limited to a small number of entries (e.g., a "short stack" of 4 entries) so that the exchange of the stack between the TTU and SM can be made more efficient. In FIG. 13, a bottom stack entry 1304 and a top stack entry 1306 are shown with one or more entries in between.

Figure 14:
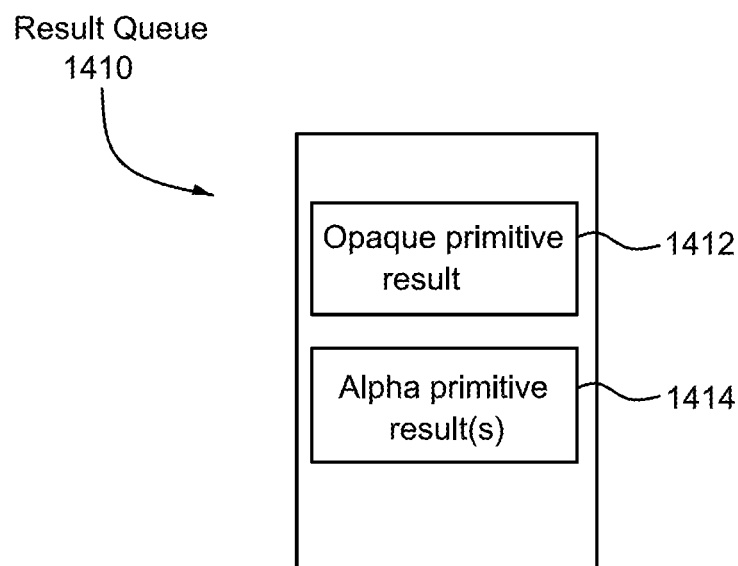
FIG. 14 shows an example results queue for use by the ray tracing pipeline according to some embodiments.

FIG. 14 shows an example results queue according to some embodiments. A result queue, as described elsewhere, is used for the TTU to transmit information about the intersections detected so far to the SM. In some embodiments, the result queue 1410 is small and may only accommodate an opaque primitive intersection result 1412 and/or one or more alpha primitive intersection result 1414. However, in other embodiments, the result queue may accommodate more entries representing detected intersections.

FIG. 15A shows some example contents of a data structure corresponding to ray 1502, including a RayOp 1520. In some example embodiments, the ray is generated in the SM 732 and the ray information is communicated to the TTU 738 by way of registers in the SM. In example embodiments in which ray data is passed to the TTU via memory, data structure 1502, or part thereof, may reside in a memory to be read by the TTU. Ray data structure 1502 may include a ray identifier 1504 which may be assigned by the TTU or the SM to uniquely identify rays that are concurrently being processed in the TTU, ray origin 1506, ray direction 1508, ray start (tmin) 1510 and end (tmax) 1512 parameters. According to some embodiments, the ray information 1502 may also include ray flags 1514, RCT mode flags 1516 (also referred to as RCT mode bits), RPT mode flags 1518 (also referred to as RPT mode bits) and one or more ray operation (RayOps) specifications. Each RayOps specification may include a ray operation opcode 1520 and ray test parameters (e.g., ray parameters A & B). These ray data attributes are described below.

As described below, a "RayOp" test is performed for each primitive or child bounding box intersected by a ray using the ray's RayOp opcode, mode bits, and parameters A and B as well as one or more parameters (e.g., ChildType, "rval" parameter or "alpha" flag) specified with each intersected complet child or primitive. In example embodiments, the ChildType and rval parameters used in RayOp tests described below are specified for each child in a complet, or for the complet as a whole, and the RayOp opcode, mode bits, and parameters A and B are specified for each ray.

FIG. 15B shows example 4-bit opcodes used for the RayOp, according to some embodiments. As shown, in the figure, some opcodes correspond to constant operations such as for always perform the ray operation (ALWAYS), and for never performing the ray operation (NEVER). Some other opcodes may correspond to integer operations such as, e.g., EQUAL, NOT EQUAL, GREATER etc., and yet other opcodes may correspond to operations based on the ray's length and like parameters (TMIN_LESS, TMAX_GEQUAL, etc.).

The rightmost column in FIG. 15B shows the logical or integer test performed for the ray operation. The input parameters for the test may include three constants according to some embodiments: two 8-bit or 16-bit constants A and B provided by the ray, and an 8-bit "rval" provided by the node or child node in the acceleration data structure. Additionally, the tmin or the tmax of the ray and the child bounding volume may be used in some tests.

In some embodiments, the rayop and associated data can be specified separately for traversal in the TLAS and BLAS. According to example embodiments, the rayop that is set for the ray is the same for all nodes intersected by that ray, except when the FRA flag is set for a node in which case the rayop for that single node and ray is set to "ALWAYS" (always true, no action).

FIG. 15C shows example mode specifiers according to some embodiments. These include ray-complet test (RCT) mode specifiers and ray-triangle test (RTT) mode specifiers. The example mode specifiers may specify actions to be performed based on the result (i.e. pass or fail) of the rayop-based test and based on the node type in which the test is performed. Example node types include an instance node (instance node mode), an item range (item range mode), a triangle range (triangle range mode), child complet (child complet mode), alpha triangle hit (alpha triangle hit mode), and an opaque triangle hit (opaque triangle hit mode). For each combination of a node type and a test result, one or more specified actions are defined based on the value of the flag. The specified actions, indicated by the value of the respective mode specifiers, may include, for example, an action of continuing to process in the hardware coprocessor, an action of culling, an action of returning to the processing as a node reference, an action of returning to the processor, an action of treating an intersected triangle as an alpha or opaque triangle, and the like. As an example, an instance node which is intersected by a ray but that fails the ray op test would use the "in_f" (modelInstanceNodeFail) bits that would indicate whether that specific instance node should be processed in the TTU 738, culled, returned to SM 732 as a node reference, or returned to SM 732 as is.

An example of a node data structure 1622 may hold RayOp-related information for a complet or bounding volume according to some embodiments is shown in FIG. 16A. According to some embodiments, data structure 1622 may be stored in a memory by software, and the TTU may either access the data structure in the memory and/or may receive the data structure into the TTU internal memory. The data structure 1622 may include header information 1624, one or more override flags 1626 and an rval 1628. Header information may include geometric information, node type information etc., related to the node. Override flags 1626 and rval parameter 1628 are described below. The rval flags 1628 and the override flags and parameters 1626 may be used by the RayOp test.

Figure 16C:
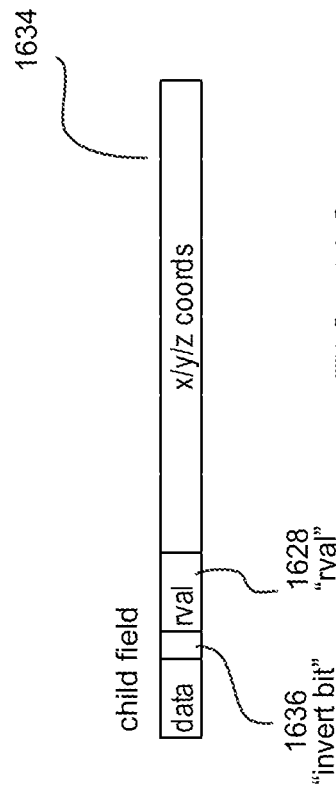

FIG. 16B illustrates an example data structure for a complet 1630. The example complet data structure includes a header area, and an area holding the data for each child of the root node of that complet. The header portion includes x, y, z parameters defining the corresponding bounding volume. The header portion also includes the FRA flag 1633. The data in the complet for each child 1634 includes, as shown in FIG. 16C, an "real" 1628 and an invert bit 1636.

Example Ray Operation with Force Ray Always (FRA) Flag not Set

Figure 17:
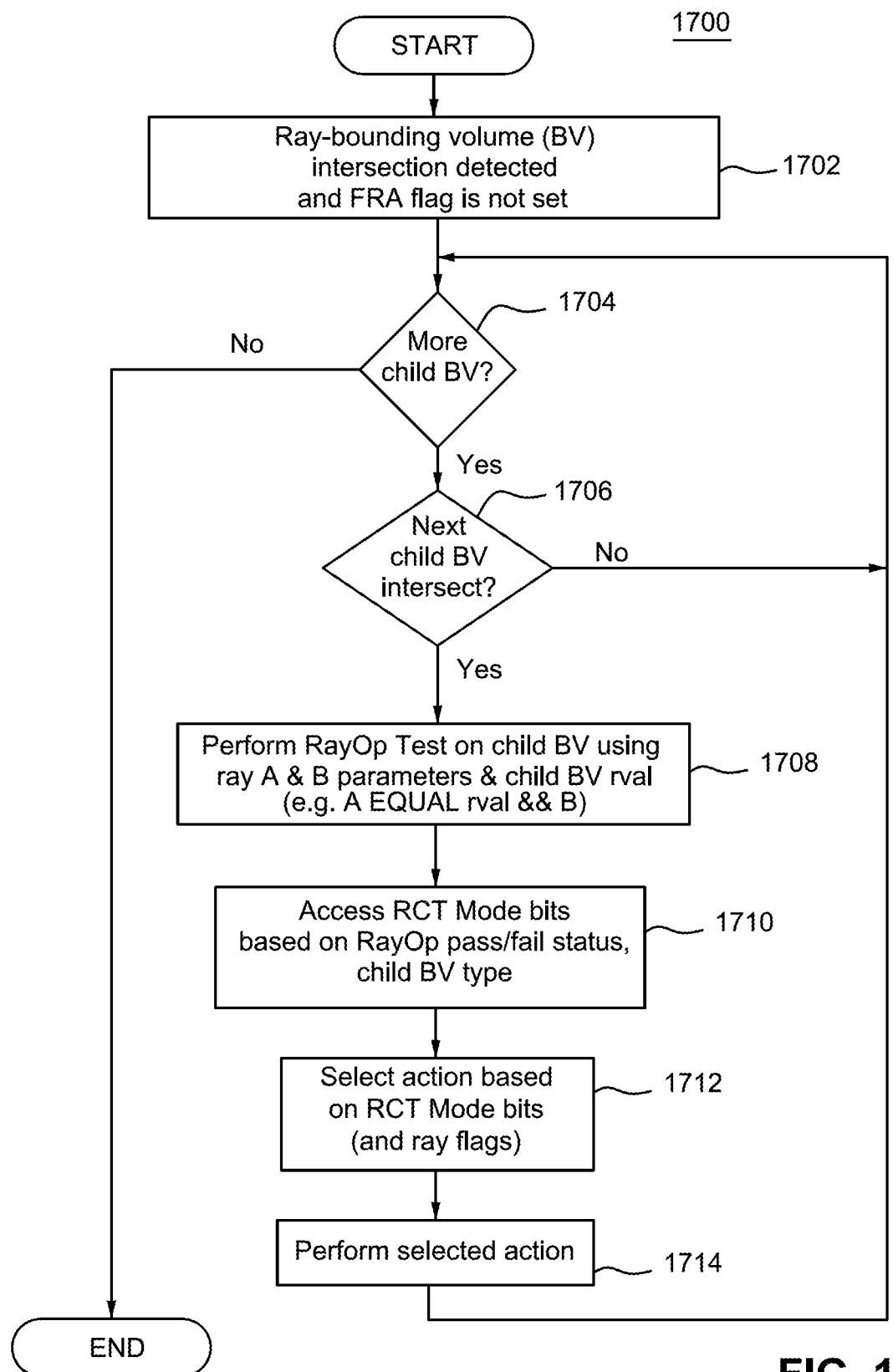
FIG. 17 shows an example process with a per-node selectable programmable ray operation in hardware, according to some embodiments.

FIG. 17 shows a flowchart of a programmable ray operation process 1700 that may be performed when a ray-bounding volume intersection is detected during ray tracing pipeline processing and it is determined that the FRA flag for that bounding volume is not set (e.g., value of FRA flag is 0). For example, process 1700 may be performed when a ray-bounding volume intersection is detected in step 1210 and/or 1224 shown in FIG. 12A (e.g., in the top level traversal and/or in the bottom level traversal) with respect to process shown in FIG. 12A. Ray-bounding volume intersection tests 1210 and/or 1224 may be performed in TTU 738 in the ray-complet test (RCT) block 1110.

At step 1702, the ray-intersection test in a bounding box corresponding to a node determines that the bounding box/node is intersected by the ray, and also that the corresponding FRA flag is not set (e.g. flag value is equal to 0), thus enabling the performing of the programmable ray operation at the node.

The intersection detection at step 1702 may occur when testing a retrieved complet, or more specifically, testing a child bounding volume included in the retrieved complet. According to example embodiments, when a complet is processed, the TTU may optionally perform the RayOp test on each child. In some embodiments, the RayOp test is run only on the children whose corresponding bounding volume was intersected by the ray.

Thus at step 1704, it is determined that the fetched complet has at least one child, and at step 1706 the child bounding volumes are accessed and tested. The child bounding volumes may be tested in parallel. In some embodiments, each retrieved complet has zero or one parent complet and zero or more complet children and zero or more leaf node children. In some embodiments, each fetched complet references its parent complet with a parent pointer or offset, encodes child pointers in compressed form, and provides a per-child structure containing a child bounding box and per-child data used by the RayOp test (e.g. Rval, invert RayOp result flag), and (in the case of leaf nodes) data used to address and process blocks of leaf nodes (e.g. item count, starting primitive index, number of blocks in leaf, a flag indicating the presence of alpha primitives). In some embodiments, processing steps 1708-1714 may be performed in parallel for all children bounding volumes. In some other embodiments, processing steps 1708-1714 may be performed child-by-child, in parallel for groups of child bounding volumes. etc.

Each of the child bounding volumes of the intersected parent are potential traversal targets. In example embodiments, an instance node is a leaf node that points to the root node of another BVH. The RayOp test may be performed on the child nodes of an intersected parent based upon the child bounding volume information available in the already retrieved complet, before determining whether or not to retrieve the complets corresponding to the respective child nodes for traversal.

At step 1708, the RayOp test specified for the ray is performed with respect to the accessed child bounding volume. As noted above in relation to FIG. 15A-C, the RayOp opcode may be specified as part of the ray data provided to the TTU 738 from the SM 732. In example embodiments, when the ray-bounding volume intersection is detected at ray-complet test block 1010, the RCT block 1010 and/or the traversal logic block 1012 may perform the RayOp test based on parameters from the ray, a child node of the intersected bounding volume, and optionally a t-value associated with the intersection of the ray and the child node of the intersected bounding volume. The result of the test is used to select between a pair of mode specifiers that determine how an intersected node of a given type should be handled during traversal. More specifically, the RayOp test specified by the particular RayOp opcode specified for the ray is performed using the ray's RayOp, A, B parameters (mode specifiers) and the rval parameter specified for the child bounding volume. In some embodiments, the RayOp test is performed only for child bounding volumes that are themselves found to intersect the ray. For example, when the RCT unit tests a ray against a complet, each of the complet's child bounding volumes are also tested for intersection with the ray and, for each child that is found to intersect the ray, the RayOp test is performed. RayOp testing is described in U.S. patent application Ser. No. 16/101,180 titled "Query-Specific Behavioral Modification of Tree Traversal", which is already incorporated by reference, also assigned to Nvidia Corporation.

Child nodes can be either instance nodes, item ranges, triangle ranges, or complets. For any intersected child node in RCT traversal, the modes dictate whether it should be processed in the TTU (if possible), ignored (also referred to as, culled), or returned to the SM. If returned to the SM, there is the additional option to return either the node itself or a reference to the node which means returning the parent node with an index of the child node. The TTU may not further process item ranges, and the item ranges may be returned to the SM for further processing.

If a child node is not intersected by the ray in the RCT, then the resulting operation is a cull and neither the ray op nor mode flags matter.

Additionally for ray ops on triangle leaves, the ray op result is passed through to the triangle intersection test in the ray-triangle transform and test (RTT) unit, where the mode specifiers can be used to alter behavior.

An example RayOp test may provide for testing a left hand side numerical value based on a ray parameter with respect to a particular arithmetic or logic operation, against a right hand side value based on a ray parameter and a parameter of the intersected node. The RayOp test may be an arithmetic or a logical computation that results in a true/false output. The particular computation (e.g., the particular relationship between the RayOp A and B parameters, the RayOp opcode and the rval parameter) may be configurable, and/or may be preprogrammed in hardware. In some embodiments, each ray may specify one of a plurality of opcodes corresponding to respective RayOp tests. Thus, the RayOp test provides a highly flexible technique by which rays can change the default ray tracing behavior of the TTU 738 on an individual or group basis.

The RayOp tests may include any of, but are not limited to, the arithmetic and/or logic operations ALWAYS, NEVER, EQUAL, NOTEQUAL, LESS, LEQUAL, GREATER, GEQUAL, TMIN_LESS, TMIN_GEQUAL, TMAX_LESS, TMAX_GEQUAL, as opcodes. The opcode specified in a ray may, in some embodiments, be any logical or arithmetic operation.

For example, if the ray's RayOp opcode is defined in the ray information provided to the TTU as "EQUAL", and the RayOp A and B parameters are 0x0 and 0xFF, respectively, and the accessed child bounding volume's RayOp rval is 0x1, the RayOp test may be "A EQUAL rval && B". Thus, with the above noted values for the various parameters and opcode, the RayOp test yields "0x00==0x1 && 0xFF". Thus, (since this is false) the RayOp test in this example must return false. That is, in this particular example, the RayOp test fails for the ray and the accessed child bounding volume.

In some embodiments, the child bounding volume may also have an invert ("e.g., inv") parameter associated with the RayOp testing. If the ray and/or child node also has an invert parameter associated with the RayOp, and the invert parameter is set to TRUE (e.g., 1), then the returned RayOp result may be the inverse of the actual RayOp test result. For example, if the invert parameter was set to TRUE, then the RayOp test in the above example would return TRUE. RayOps may be comparable to the Stencil Test in raster graphics, except that Stencil Test has the ability to allow a fragment write to occur even when the fragment failed the Depth Test. In example embodiments, the RayOps do not have the capability to convert a missed complet child into a hit complet child, but in other embodiments the TTU could allow programmability so a RayOp could treat a miss as if it were a hit.

It is not necessary that the RayOp test has the parameters and the opcode arranged in a relationship such as "A EQUAL rval && B". Example embodiments may have the parameters and the opcode arranged in any logical or arithmetic relationship. In some embodiments, for example, the relationship may be of a form such as "TMIN_LESS rval" or "TMIN_LESS A & rval", expressing a relationship between a specified area of interest and either the node parameter alone or a combination of the ray parameters and the node parameter. The example opcodes TMIN_LESS, TMIN_GEQUAL, TMAX_LESS, TMAX_GEQUAL all enable the RayOp test to be based upon the intersection's start or end (e.g., TMIN and TMAX in the above opcodes may represent the t values at the ray's entry to and exit from the intersected volume (e.g., bbox.tmin, bbox.tmax below), respectively), and to include aspects of either the tested node alone or the tested node and the ray parameters A and/or B. For example, when rval is encoded with a distance value for the node, "TMIN_LESS rval" may represent a test such as "is the tested node at a distance less than the beginning of the area of interest?". Opcodes based on aspects of the ray other than start/end of the ray are also possible, and may be used for the RayOp in other embodiments. In contrast to opcodes that encode an aspect of the ray's geometric properties, example opcodes ALWAYS, NEVER, EQUAL, NOTE- QUAL, LESS, LEQUAL, GREATER, GEQUAL enable an arbitrarily-specified left hand side value to be compared to an arbitrarily-specified right hand side value. Thus, example opcodes ALWAYS, NEVER, EQUAL, NOTEQUAL, LESS, LEQUAL, GREATER, GEQUAL may be used for RayOp tests that depend on some geometric aspects of either the ray or the tested node, and moreover may be used for RayOp tests that are independent of any geometric properties of either or both the ray and the tested node. Thus, in example non-limiting embodiments, "FLT_TMIN_LESS", "FLT_T-MIN_GEQUAL" and "FLT_TMAX_LESS", and "FLT_T-MAX_GEQUAL" RayOp tests actually evaluate the expressions bbox.tmin<A*rval+B, bbox.tmin>=A*rval+B, bbox.tmax<A*rval+B, bbox.tmax>=A*rval+B, respectively. In one particular non-limiting embodiment, rval is an FP0.6.2 value and A and B are FP1.5.10 values for these operations. Moreover, in some non-limiting example embodiments, since the FLT_TMIN and FLT_TMAX tests operate on the bounding box tmin and bounding box tmax values which may be geometric values computed in the intersection test, these RayOps may be used for geometric level-of-detail (e.g., where A corresponds to the cosine of the angle of the cone subtends the image plane pixel and B corresponds to the accumulated length of the previous bounces of the ray and rval corresponds to the max length of the bounding box). In some embodiments, the opcodes (e.g., FLT_TMIN_LESS, FLT_TMAX_LESS) provides for comparing a value computed during the ray/acceleration data structure intersection test scaled by one geometric attribute associated with the ray and biased by another geometric attribute associated with the ray to at least one geometric parameter associated with the at least one node.

At step 1710, one or more mode flags (sometimes also referred to as "mode specifiers") corresponding to the RayOp test result are identified. Each mode flag may be specified, for example, in a predetermined bit position in a ray data structure, and may include any number of bits. Each mode flag maps a result of the RayOp test or a combination of the result of the RayOp test and a node type of the tested node, to a particular action to be taken by the TTU. In some embodiments, the mode flags are separately specified with the ray for ray-complet testing and ray-primitive testing respectively. Thus, in response to completing the RayOp test at step 1710, the applicable mode flag(s) may be found in the RCT mode flags specified for the ray.

In the above example, since the RayOp test failed, the applicable mode flag(s) include the "ch_f mode flag". As described above, "ch_f" represents that the RayOp test failed for intersected child of type complet.

At step 1712, an action to be performed based on the identified mode flag(s) and/or ray flags is identified, and performed.

RCT mode flags express for each complet child type (e.g., complets, instance leaf nodes, item range leaf nodes, primitive range leaf nodes) how the TTU is to handle ray intersections with child-bounding-volumes for child nodes of that type for those rays that pass or fail the RayOp test. Example RCT mode flags include "In_f", "In_p", "Ir_f", "Ir_p", "pr_f", "pr_p", "ch_f", and "ch_p".

The mode flag "In_f" ("modeInstanceNodeFail") specifies an action to be performed when the RayOp test fails for intersected child of type instance node ("InstanceNode"). The supported actions may include processing in TTU, culling (e.g., suppress push of instance node onto traversal stack), return as node reference, or return to SM.

The mode flag "In_p" ("modeItemRangePass") specifies an action to be performed upon the RayOp test passing for an intersected child of type instance node. The supported actions may include processing in TTU, culling (e.g., suppress push of instance node onto traversal stack), return as node reference, or return to SM.

The mode flag "Ir_f" ("modeItemRangeFail") specifies an action to be performed upon the RayOp test failing for an intersected child of type item range ("ItemRange"). The supported actions may include returning to SM (e.g., push item range hit into the result queue), culling (e.g., suppress storage of item range hit in the result queue), or return as node reference.

The mode flag "Ir_p" ("modeItemRangePass") specifies an action to be performed upon the RayOp test passing for an intersected child of type item range. The supported actions may include return to SM (e.g., push item range hit into the result queue), cull (e.g., suppress storage of item range hit in the result queue), or return as node reference.

The mode flag "pr_f" ("modePrimitiveRangeFail") specifies an action to be performed upon the RayOp test failing for an intersected child of type primitive range ("PrimitiveRange"). The supported actions may include processing in TTU (e.g., push entry onto traversal stack), cull (e.g., suppress push of triangle range stack entry onto traversal stack), return as node reference, or return to SM.

The mode flag "pr_p" ("modePrimitiveRangePass") specifies an action to be performed upon the RayOp test passing for intersected child of type primitive range. The supported actions may include processing in TTU (e.g., push entry onto traversal stack), cull (e.g., suppress push of primitive range stack entry onto traversal stack), return as node reference, or return to SM.

The mode flag "ch_f" ("modeCompletFail") specifies an action to be performed when the RayOp test fails for an intersected child of type complet ("complet"). The supported actions may include traversing in TTU, cull, or return as node reference.

The mode flag "ch_p" ("modeCompletPass") specify an action to be performed when the RayOp test passes for an intersected child of type complet. The supported actions may include traversing in TTU, cull, or return as node reference.

In some embodiments, in addition to the mode flag(s) selected in accordance with the RayOp test result, the selected action may be performed in a manner consistent with one or more ray flags specified in the ray data. The ray flags, such as ray flags 1514, may specify behavior independent of any particular intersection.

In example embodiments, the ray flags may specify an order of traversal for the bounding volumes, whether or not to pop the stack on return, whether or not to report node references to the SM when the ray's tmin tmax interval starts inside the node's bounding box, whether or not to return at the first hit of an intersection, front-facing settings, cull settings and the like.

The ray flags for traversal order may specify any one of: traversal in order of parametric distance along the ray, traversal in memory order of the bounding volumes and/or primitives, decreasing x coordinate, increasing x coordinate, decreasing y coordinate, increasing y coordinate, decreasing z coordinate, and increasing z coordinate, etc. More specifically, the traversal order dictates the order that stack entries get pushed onto the traversal stack when complet child bounding volumes are intersected by the ray. In particular, when a node is intersected, the traversal order specified by the ray flags may be used by the TTU to determine in which order the child nodes of the intersected node are to be pushed into the traversal stack. It is useful for example for tracing shadow rays that are set to return on the first hit found and not specifically the nearest hit, where it is desirable for such rays to first test against larger primitives (and thus more likely to be hit). If the BVH is built in such a manner that the memory order of leaf node children is largest-first, then it is desirable to choose memory order over t-order for such rays because it is more likely to return quicker to the SM and t-ordering is immaterial for such rays.

One may desired to change traversal order (t-order) for any of several reasons. For example, when trying to find the closest triangle, one would typically want to use—order so that those primitives that might come earlier in parametric length are tested first. If those primitives are intersected, then primitives and complets farther along the ray may not need to be tested. When trying to find any intersection (e.g., to test if a point is in shadow from a light), then one may not care about which specific primitives are intersected and may want to test the primitives that are most likely to be intersected first. In that case, the BVH builder may put the largest triangles earlier in the tree such that memory order will find them first.

The x/y/z ordering of traversal each may be used to approximate t-ordering in the case when t-ordering may not be consistent. Specifically, the t-intersection for a beam traversal and a ray traversal may not be consistent because the queries are different shapes. (e.g., they may be similar, but not identical). The x/y/z ordering, however, are each based on the bounding volume positions alone, and are consistent. If the processing requires something like sharing the stack between a beam and a ray, then one may use the consistent x/y/z ordering to get performance close to t-order.

The ray flags for indicating whether to pop the traversal stack on return (e.g., "noPopOnReturn"), may specify whether the stack is to be popped, and/or whether to return the result of the traversal without popping the stack. Returning the result of the traversal without popping the traversal stack may enable the SM to rerun the same traversal or modify the stack before starting a new traversal.

The ray flags controlling the reporting of hits (e.g., "reportOnEnter" flag) may specify that the TTU is to only report a child hit if AABB intersection point t is greater than or equal to the ray's tmin, and to cull (and/or not report to the SM) otherwise. This flag enables a bounding volume to not be reported to the SM even if it is intersected, if that intersection point (upon the ray's entry to the bounding volume) occurs before the ray's specified area of interest. One example use of this flag is for ray marching where after finding an intersection, the tmin is advanced to be the start of that intersection. On relaunch one may want to find the next intersection, but typically would not want to report again the intersection that was just returned. By setting the reportOnEnter flag, returning the intersection again to the SM can be avoided because a relaunched ray does not enter the volume, but rather starts inside of it.

The ray flags controlling whether to terminate upon the first hit (e.g., "terminateOnHit") specifies whether the TTU is to return at the first hit for the ray found during traversal, or to keep on traversing until it can return the parametrically nearest hit found.

The ray flags(s) that indicate what triangles are to be considered front facing (e.g., "facingfrontFaceCW") may be used to specify certain treatment of intersected leafs. For example, these flags may specify treatment of counterclockwise winding triangles as front facing, or treatment of clockwise winding triangles as front facing assuming right-handed coordinate system.

Ray flags controlling culling of intersected primitives (e.g. "cullMode") may be specified to indicate no culling, cull back-facing primitives, cull front facing primitives, or to disable culling and primitive edge testing.

The traversal logic (e.g., traversal logic block 1012) performs the action enumerated by the appropriate mode flag(s) based on the result of the RayOp test (or the inverse of the result of the RayOp test, if the child invert flag is set). In the above example, since the ch_f mode flag indicates that the child bounding volume is to be culled when they RayOp test fails, then the traversal logic will not push a stack entry onto the ray's traversal stack for this child bounding volume even though the ray may intersect the child's bounding volume and the default behavior for intersected child bounding volumes is for the child to be pushed into the traversal stack. Note that ray could have, instead of specifying a value for ch_f mode flag indicating that the child is to be culled if the RayOp test fails, indicated alternatively that the child is to be traversed in the TTU, or be returned as a node reference.

The action by the traversal logic may be performed, at step 1714 in a manner consistent with ray flags of the ray. For example, where the ray flags indicate a particular traversal order, the child bounding volumes selected for traversal in accordance with the RayOp test may be pushed to the traversal stack in a manner consistent with the traversal order specified by the corresponding ray flag(s).

Since in step 1712, the child nodes that are selected according to the RayOp test are pushed on to the traversal stack, the selected child nodes are traversed in the order that they are popped from the traversal stack.

Steps 1704-1714 may be repeated for each child of the intersected bounding volume. When each of the child nodes, or at least each of the child nodes that are themselves found to intersect with the ray have had a RayOp performed, the parent bounding volume has completed its traversal step. That is, in the case where a complet includes only a root bounding volume and its child bounding volumes, the traversal of that complet has completed. More generally, as when the complet includes a root and more than one level of nodes, the traversal of the complet is complete when all the leaf nodes of the complet, or at least all those that have not been culled, have been subjected to the ray-bounding volume intersection test and/or the RayOp test.

The above description of process 1700 applied to, at step 1702, determining that the ray intersects the node and the node does not have the FRA flag set. If instead, at step 1702 it is determined that the ray intersects the node and that the FRA flag is set at the node, then the ray's programmable ray operation is overridden to the "ALWAYS" ray operation which effectively ignores the ray's programmable ray operation with respect to the child nodes and proceeds to treat the child nodes as nodes to be traversed. This override remains in effect only for that node/complet. When the FRA flag being set is implemented by overriding the ray's ray operation to "ALWAYS", the per child node invert bit may still apply to allow the complet to still use both the pass and fail mode flags, although the decision is static instead of dynamic.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 750 illustrated in FIG. 7).

Figure 18:
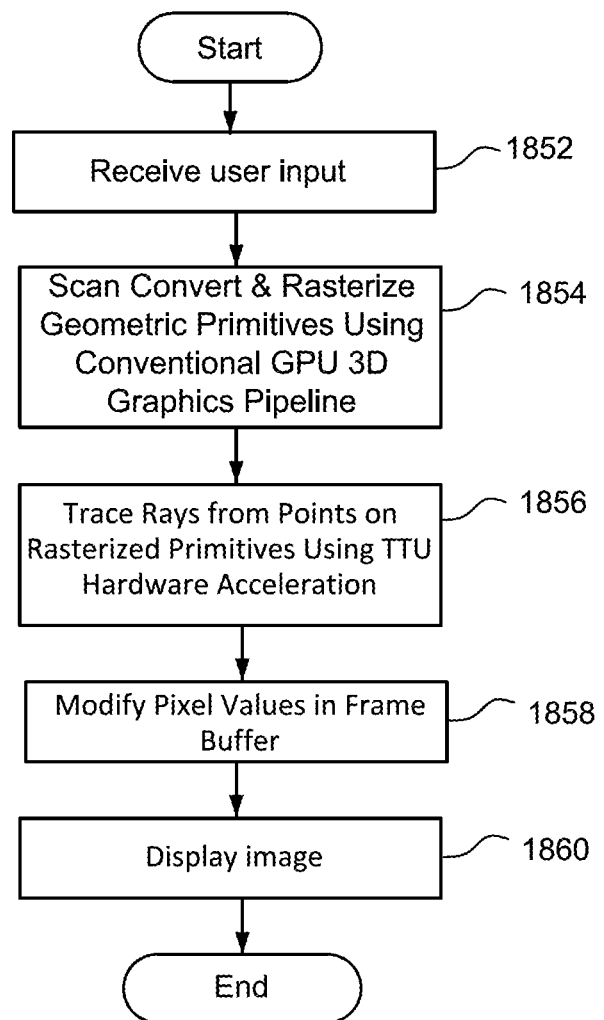
FIG. 18 is a flowchart of an example process to generate an image, according to some embodiments.

Meanwhile, however, the technology herein provides advantages when used to produce images for virtual reality, augmented reality, mixed reality, video games, motion and still picture generation, and other visualization applications. FIG. 18 illustrates an example flowchart for processing primitives to provide image pixel values of an image, in accordance with an embodiment. As FIG. 18 shows, an image of a 3D model may be generated in response to receiving a user input (Step 1852). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1854). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1856, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1858). Modifying the pixel values may in some applications for example improve the image quality by, for example, applying more realistic reflections and/or shadows. An image is displayed (Step 1860) using the modified pixel values stored in the buffer.

In one example, scan conversion and rasterization of geometric primitives may be implemented using the processing system described above, and ray tracing may be implemented by the SM 732 using the TTU 738 architecture described in relation to FIG. 10, to add further visualization features (e.g., specular reflection, shadows, etc.). FIG. 18 is just a non-limiting example—the SM's 732 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 738 in some embodiments is stateless, meaning that no architectural state is maintained in the TTU between queries. At the same time, it is often useful for software running on the SM 732 to request continuation of a previous query, which implies that relevant state should be written to registers by the TTU 738 and then passed back to the TTU in registers (often in-place) to continue. This state may take the form of a traversal stack that tracks progress in the traversal of the BVH.

A small number of stack initializers may also be provided for beginning a new query of a given type, for example:
Traversal starting from a complet
Intersection of a ray with a range of triangles
Intersection of a ray with a range of triangles, followed by traversal starting from a complet
Vertex fetch from a triangle buffer for a given triangle
Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 738 can return to the SM. Example node types are:
A child complet (i.e., an internal node)
By default, the TTU 738 continues traversal by descending into child complets.
A triangle range, corresponding to a contiguous set of triangles within a triangle buffer
(1) By default, triangle ranges encountered by a ray are handled natively by the TTU 738 by testing the triangles for intersection and shortening the ray accordingly. If traversal completes and a triangle was hit, default behavior is for the triangle ID to be returned to SM 732, along with the t-value and barycentric coordinates of the intersection. This is the "Triangle" hit type.
(2) By default, intersected triangles with the alpha bit set are returned to SM 1840 even if traversal has not completed. The returned traversal stack contains the state required to continue traversal if software determines that the triangle was in fact transparent.
(3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.
An item range, consisting of an index (derived from a user-provided "item range base" stored in the complet) and a count of items.

By default, item ranges are returned to SM 1840 as an "ItemRange" hit type, consisting of for example an index, a count, and the t-value of the intersection with the leaf bounding box.

An instance node.

The TTU 738 in some embodiments can handle two levels of instancing natively by transforming the ray into the coordinate systems of two instanced BVHs. Additional levels of instancing (or every other level of instancing, depending on strategy) may be handled in software (or in other embodiments, the TTU 738 hardware can handle three or more levels of instancing). The "InstanceNode" hit type is provided for this purpose, consisting of a pointer to the instance node and the tvalue of the intersection with the leaf bounding box. In other implementations, the hardware can handle two, three or more levels of instancing. An instance node may also be configured with an instance mask that indicates the node's participation none, one or more than one groups of geometry that is selectable on a per-ray basis with an instance inclusion mask included in the ray. A valid flag may also be available to indicate whether the instance mask is valid or invalid.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 738.

Additional mode flags may be provided for control handling of alpha triangles.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

All patents & publications cited above are incorporated by reference as if expressly set forth. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ray tracing acceleration hardware device, comprising:
memory configured to store at least portions of an acceleration data structure;
ray storage configured to store an opcode from a ray received from a processor;
traversal circuitry configured to traverse the acceleration data structure according to the ray, the traversing including, at a node of the acceleration data structure, (a) performing an operation specified by the opcode on one or more child nodes of the node if a flag stored in the acceleration data structure is in a first state, and (b) ignoring the operation if the flag is in a second state; and
intersection detection circuitry configured to detect one or more intersections of the ray with one or more nodes of the acceleration structure during the traversing and return information of the detected intersection to the processor.

2. The ray tracing acceleration hardware device according to claim 1, wherein the traversal circuitry is further configured to, if the flag is in the second state, traversing a child node of the node without performing the operation on the child node.

3. The ray tracing acceleration hardware device according to claim 1, wherein the traversal circuitry is further configured to, if the flag is in the first state, determine, based on the performed operation whether to traverse a child node of the node, and responsive to a result of the determining either traversing the child node or not traversing the child node.

4. The ray tracing acceleration hardware device according to claim 1, wherein the traversal circuitry is further configured to, if the flag is in the first state, perform the operation using the opcode, and at least one parameter specified in the ray other than the opcode.

5. The ray tracing acceleration hardware device according to claim 4, wherein the traversal circuitry is further configured to, if the flag is in the first state, perform the operation using at least one parameter specified in a child node of the node.

6. The ray tracing acceleration hardware device according to claim 1, wherein the node the flag is a bit.

7. The ray tracing acceleration hardware device according to claim 1, wherein the flag encodes a default action, and wherein the traversal circuitry is further configured to, when the flag is in the second state, perform the default action, instead of performing the operation, at the node.

8. The ray tracing acceleration hardware device according to claim 1, wherein the flag is in a complet including the node and one or more child nodes of the node, and wherein the node includes a node parameter that is used in the logical operation with one or more parameters from the ray.

9. The ray tracing acceleration hardware device according to claim 1, wherein, whereas the detecting of the one or more intersections is based on x, y and z coordinates associated with the node of the acceleration structure and the ray, the operation is based on parameters other than the x, y and z coordinates associated with the node and the x, y and z coordinates of the ray.

10. The ray tracing acceleration hardware device according to claim 9, wherein the operation is based on, in addition to the opcode, a parameter in the node and parameters in the ray.

11. The ray tracing acceleration hardware device according to claim 10, wherein the parameters in the ray includes a length of the ray.

12. The ray tracing acceleration hardware device according to claim 1, wherein the node is in a bottom level acceleration structure (BLAS) complet, and wherein the traversal circuitry is further configured to, if the flag is not set, to perform the logical operation according to the opcode at each child node of the node.

13. The ray tracing acceleration hardware device according to claim 12, wherein the traversal circuitry is further configured to, if the flag is set, not performing the operation specified by the opcode at any child node of the node.

14. The ray tracing acceleration hardware device according to claim 1, wherein the flag is set in the node, and wherein the traversal circuitry is further configured to, if the flag is in the second state, determining, based on an invert bit in a child node of the node, whether or not to traverse the child node without performing the operation on the child node.

15. A ray tracing system comprising:
a processor configured to generate a ray including an opcode; and
a ray tracing acceleration hardware device, comprising:
memory configured to store at least portions of an acceleration data structure;
ray storage configured to store the opcode from the ray;
traversal circuitry configured to traverse the acceleration data structure according to the ray, the traversing including, at a node of the acceleration data structure, (a) performing an operation specified in the opcode on one or more child nodes of the node if a flag stored in the acceleration data structure is in a first state, and (b) ignoring the operation if the flag is in a second state; and
intersection detection circuitry configured to detect one or more intersections of the ray with one or more nodes of the acceleration structure during the traversing and return information of the detected intersection to the processor.

16. The ray tracing system according to claim 15, wherein the traversal circuitry is further configured to, if the flag is in the second state, traversing a child node of the node without performing the operation on the child node.

17. The ray tracing system according to claim 15, wherein the traversal circuitry is further configured to, if the flag is in the first state, determine, based on the performed operation whether to traverse a child node of the node, and responsive to a result of the determining either traversing the child node or not traversing the child node.

18. A ray tracing acceleration method, comprising:
receiving, in a hardware coprocessor, a ray from a processor, the ray specifying an opcode;
storing the opcode in a ray storage in the hardware coprocessor;
traversal circuitry configured to traverse the acceleration data structure according to the ray, the traversing including, at a node of the acceleration data structure, (a) performing an operation specified in the opcode on one or more child nodes of the node if a flag stored in the acceleration data structure is in a first state, and (b) ignoring the logical operation if the flag is in a second state; and
intersection detection circuitry configured to detect one or more intersections of the ray with one or more nodes of the acceleration structure during the traversing and return information of the detected intersection to the processor.

* * * * *